US010431113B2

(12) United States Patent
Thomas

(10) Patent No.: US 10,431,113 B2
(45) Date of Patent: Oct. 1, 2019

(54) METHOD AND SYSTEM FOR VERIFYING AND DETERMINING ACCEPTABILITY OF UNVERIFIED SURVEY ITEMS

(71) Applicant: TipTap, Inc., Cambridge, MA (US)

(72) Inventor: Kyle A. Thomas, Cambridge, MA (US)

(73) Assignee: MotiveMetrics Inc., Cambridge, MA (US)

( * ) Notice: Subject to any disclaimer, the term of this patent is extended or adjusted under 35 U.S.C. 154(b) by 615 days.

(21) Appl. No.: 13/659,260

(22) Filed: Oct. 24, 2012

(65) Prior Publication Data

US 2013/0122474 A1 May 16, 2013

Related U.S. Application Data

(60) Provisional application No. 61/560,062, filed on Nov. 15, 2011.

(51) Int. Cl.
*G06Q 30/02* (2012.01)
*G09B 19/00* (2006.01)

(52) U.S. Cl.
CPC ............. *G09B 19/00* (2013.01); *G06Q 30/02* (2013.01); *G06Q 30/0201* (2013.01)

(58) Field of Classification Search
CPC ... G09B 5/06; G09B 7/06; A61B 5/16; G06Q 30/0203; G06Q 30/02
USPC ........................................................ 434/236
See application file for complete search history.

(56) References Cited

U.S. PATENT DOCUMENTS

| 7,440,946 | B2* | 10/2008 | Bloedorn | |
|---|---|---|---|---|
| 7,730,002 | B2* | 6/2010 | Afeyan et al. | 706/13 |
| 7,818,185 | B2* | 10/2010 | Bjorner et al. | 705/3 |
| 2003/0078804 | A1* | 4/2003 | Morrel-Samuels | 705/1 |
| 2004/0107077 | A1* | 6/2004 | Sinha et al. | 703/2 |
| 2004/0133463 | A1* | 7/2004 | Benderev | 705/10 |

(Continued)

OTHER PUBLICATIONS

STIC search results, Oct. 30, 2014, Author, NPL database, IP.com.*

(Continued)

*Primary Examiner* — Xuan M Thai
*Assistant Examiner* — Sadaruz Zaman
(74) *Attorney, Agent, or Firm* — Morse, Barnes-Brown & Pendleton, P.C.; Sean D. Detweiler, Esq.

(57) ABSTRACT

A computer implemented method for determining acceptability of an unverified survey item can include outputting interactive displays comprising a survey. The survey can include a verified quantitative item for measuring respondent positions along a continuum for a first trait, and the verified quantitative item can include a prompt and a plurality of quantitative response choices. The survey can include an unverified non-quantitative item for measuring respondent positions along the continuum for the first trait, and the unverified non-quantitative item can include a prompt and a plurality of non-quantitative response choices. A plurality of responses to the verified quantitative item and the plurality of unverified non-quantitative items can be received from a plurality of users. Psychometric acceptability of the unverified non-quantitative item can be assessed based at least in part on the plurality of responses to the unverified non-quantitative item relative to the plurality of responses to the verified quantitative item.

20 Claims, 13 Drawing Sheets

(56) References Cited

U.S. PATENT DOCUMENTS

| | | | |
|---|---|---|---|
| 2006/0224435 A1* | 10/2006 | Male et al. | 705/10 |
| 2007/0043606 A1* | 2/2007 | Kothari et al. | 705/10 |
| 2008/0021576 A1* | 1/2008 | Davier et al. | 700/91 |
| 2009/0118588 A1* | 5/2009 | Robinson et al. | 600/300 |
| 2010/0023377 A1* | 1/2010 | Sheridan | 705/10 |
| 2010/0332286 A1* | 12/2010 | Melamed et al. | 705/10 |

OTHER PUBLICATIONS

Preimuschestva i nedostatk.i kontent-analiza po sravneniyu s oprosom [online ] Penza Jan. 20, 2010 {retrieved on Dec. 26, 2012]. Retrieved from the Internet: <URL: http://xreferat.ru/84/200 1-1-preimushestva-i-nedostatki-kontent-analiza-posravneniyu-s-oproson.html>, par. "vvedenie", "dva osnovnykh klassa orosnykh; metodov: interviyu i anketirovanie", "kontent-analiz: vozmozhnosti ego ispolzovaniya i tekhnika provedeniya".

* cited by examiner

*— 74*

Eco-Friendly Survey!

*78*  *76*  *86*

7. I turn off the lights in my house:

Never                                                             Always
 ○    ○    ○    ○    ○    ○    ○    ○    ○    ○   ← *82*
 ├────┼────┼────┼────┼────┼────┼────┼────┼────┤   ← *84*
 1    2    3    4    5    6    7    8    9    10
                                                  *80*

8. I prefer taking public transportation over driving.

Strongly                                                      Strongly
disagree                                                        agree
 ○    ○    ○    ○    ○    ○    ○    ○    ○    ○
 ├────┼────┼────┼────┼────┼────┼────┼────┼────┤
 1    2    3    4    5    6    7    8    9    10

9. When you are cold in your home, how likely are you to turn on the heat?

Very likely                                                 Very unlikely
 ○    ○    ○    ○    ○    ○    ○    ○    ○    ○
 ├────┼────┼────┼────┼────┼────┼────┼────┼────┤
 1    2    3    4    5    6    7    8    9    10

⇐ BACK                                                    NEXT ⇒

*FIG. 1 (Prior Art)*

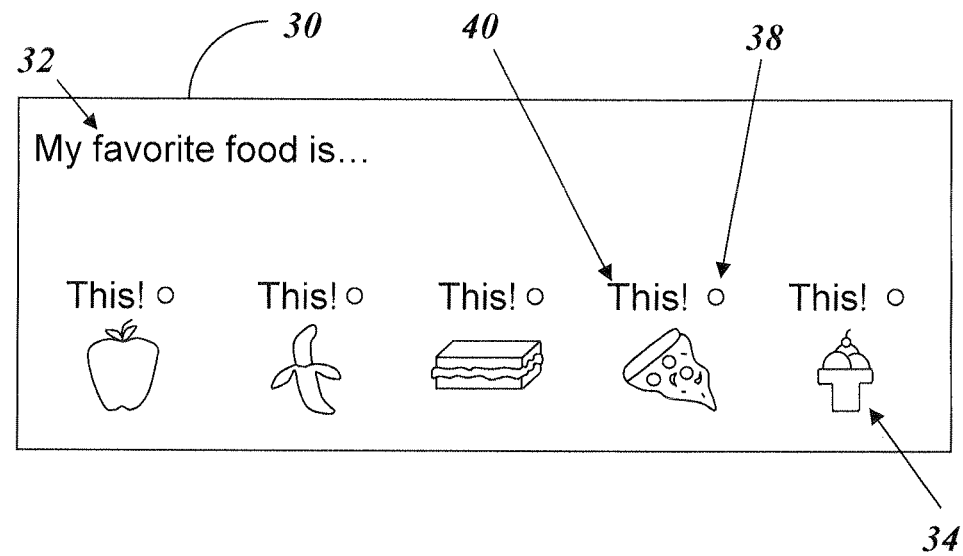
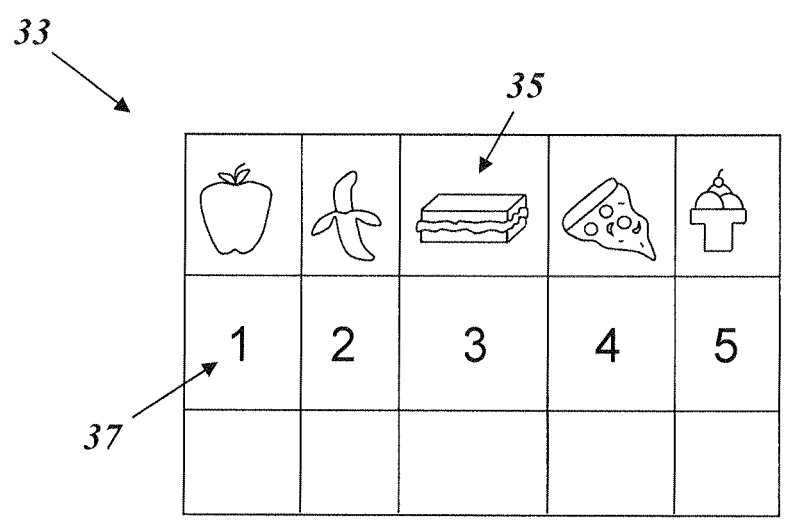
*FIG. 4A*

US 10,431,113 B2

METHOD AND SYSTEM FOR VERIFYING AND DETERMINING ACCEPTABILITY OF UNVERIFIED SURVEY ITEMS

RELATED APPLICATION

This application claims priority to, and the benefit of U.S. Provisional Application No. 61/560,062, filed Nov. 15, 2011, for all subject matter common to both applications. The disclosure of said provisional application is hereby incorporated by reference in its entirety.

FIELD OF THE INVENTION

The present invention relates to electronic surveys. More particularly, the present invention relates to computer-implemented systems and methods for verifying and determining the acceptability of one or more unverified items, including unverified non-quantitative items.

BACKGROUND OF THE INVENTION

Electronic surveys are useful tools for determining consumer demographics and for generating more effective targeted advertising. However, existing electronic surveys often utilize textual or otherwise quantitative response choices for measuring respondent positions along a continuum for a particular trait. For example, FIG. 1 depicts a conventional electronic survey 74 consisting of a plurality of survey items 76, hereinafter referred to simply as "items". The survey can be displayed on an output device (e.g., a presentation component) coupled to a computing system. Each survey item 76 can include a prompt 78 and a plurality of response choices 80. Each response choice 80 can include a selectable button 82, and/or the response choice 80 itself can be selectable within the electronic display. In the example of FIG. 1, the plurality of response choices 80 are aligned along a quantitative scale 84 containing instructional text 86 that assists in representing the quantitative values of the various response choices 80. Surveys such as the one of FIG. 1 are oftentimes presented as voluntary to users. Accordingly, to generate large respondent sample sizes the surveys must be convenient, quick, easy-to-use, and entertaining when possible.

However, existing surveys fail to provide an adequately enjoyable experience to users. As a result of this drawback, respondent data can be unrepresentative of overall populations/groups, or can be biased toward users having particular traits making them more amenable to voluntarily engaging in such surveys.

SUMMARY

Thus, there is a need for electronic surveys that are more engaging and enjoyable, as well as methods and systems for their construction. The present invention is directed toward further solutions to address these and other needs, in addition to having other desirable characteristics that will be appreciated by one of skill in the art upon reading the present specification.

According to one embodiment of the present invention, a computer implemented method for determining acceptability of an unverified survey item can include outputting, through at least one output device, one or more interactive displays comprising a survey. The survey can include a verified quantitative item for measuring respondent positions along a continuum for a first trait. The verified quantitative item can include a prompt and a plurality of quantitative response choices. The survey further can include an unverified non-quantitative item for measuring respondent positions along the continuum for the first trait, the unverified non-quantitative item comprising a prompt and a plurality of non-quantitative response choices. The method further can include receiving from a plurality of users, through at least one input device, a plurality of responses to the verified quantitative item and to the plurality of unverified non-quantitative items. Psychometric acceptability of the unverified non-quantitative item can be assessed using at least one processor based at least in part on the plurality of responses to the unverified non-quantitative item relative to the plurality of responses to the verified quantitative item.

According to further embodiments of the present invention, the step of assessing psychometric acceptability of the unverified non-quantitative item can include performing a comparative statistical analysis. The step of assessing psychometric acceptability of the unverified non-quantitative item can include determining one or more psychometric characteristics of the unverified non-quantitative item and determining whether the one or more psychometric characteristics meet one or more predetermined psychometric criteria. The step of assessing psychometric acceptability of the unverified non-quantitative item can include determining validity and reliability values of the unverified non-quantitative item. Furthermore, the method can include determining that the unverified non-quantitative item meets one or more psychometric criteria for acceptability, and in so doing, the unverified non-quantitative item can be verified.

According to further embodiments of the present invention, an interval scale value can be determined using at least one processor for each of the plurality of non-quantitative response choices included in the unverified non-quantitative item. The step of determining an interval scale value for each of the plurality of non-quantitative response choices can include performing a linear regression analysis. The step of determining an interval scale value for each of the plurality of non-quantitative response choices can include: (a) generating, using at least one processor, a dataset comprising plurality of data points each representing selections received from one of the plurality of users; and (b) determining, using at least one processor, an equation defining a best fit curve for the dataset. The step of determining an interval scale value for each of the plurality of non-quantitative response choices can include generating, using at least one processor, a dataset comprising plurality of data points each comprising a first value and a second value for a user of the plurality of users. The first value can be based on an ordinal rank of a response to the unverified non-quantitative item from the user, and the second value can be based on the response to verified quantitative item from the user.

According to further embodiments of the present invention, the step of determining an interval scale value for each of the plurality of non-quantitative response choices can include (a) generating, using at least one processor, a dataset comprising plurality of data points each representing selections received from one of the plurality of users; (b) generating one or more modified datasets based on the generated dataset, each of the one or more modified datasets having one or more substituted values; (c) determining a best fit line for each of the one or more modified datasets; and (d) selecting one of the one or more modified datasets having the best fit line associated with a lowest error variance.

According to further embodiments of the present invention, the survey further can include a plurality of additional verified quantitative items for measuring respondent positions along the continuum for the first trait. The verified quantitative item and the plurality of additional verified quantitative items can form a statistically cohesive index of items. The survey further can include a plurality of additional unverified non-quantitative items for measuring respondent positions along the continuum for the first trait. Each of the plurality of additional unverified non-quantitative items can include a prompt and a plurality of non-quantitative response choices. The step of assessing psychometric acceptability of the unverified non-quantitative item further can include assessing psychometric acceptability of the unverified non-quantitative item and the plurality of additional unverified non-quantitative items as a statistically cohesive index of items.

According to another embodiment of the present invention, a computer implemented system for verifying an unverified survey item can include at least one input device, at least one output device, at least one non-transitory computer readable storage device having instructions stored thereon, and at least one processor for executing the instructions. The instructions can cause the at least one processor to output, through the at least one output device, one or more interactive displays comprising a survey. The survey can include a verified quantitative item for measuring respondent positions along a continuum for a first trait, and the verified quantitative item can include a prompt and a plurality of quantitative response choices. The survey further can include an unverified non-quantitative item for measuring respondent positions along the continuum for the first trait, and the unverified non-quantitative item can include a prompt and a plurality of non-quantitative response choices. The instructions further can cause the at least one processor to assess, using at least one processor, psychometric acceptability of the unverified non-quantitative item based at least in part on a plurality of responses to the unverified non-quantitative item relative to a plurality of responses to the verified quantitative item.

According to yet another embodiment of the present invention, a non-transitory computer readable storage device can have instructions stored thereon, and execution of the instructions can cause at least one processor to perform a method. The method can include outputting, through at least one output device, one or more interactive displays comprising a survey. The survey can include a verified quantitative item for measuring respondent positions along a continuum for a first trait, and the verified quantitative item can include a prompt and a plurality of quantitative response choices. The survey further can include an unverified non-quantitative item for measuring respondent positions along the continuum for the first trait, and the unverified non-quantitative item can include a prompt and a plurality of non-quantitative response choices. The method can include assessing, using at least one processor, psychometric acceptability of the unverified non-quantitative item based at least in part on a plurality of responses to the unverified non-quantitative item relative to a plurality of responses to the verified quantitative item.

BRIEF DESCRIPTION OF THE FIGURES

These and other characteristics of the present invention will be more fully understood by reference to the following detailed description in conjunction with the attached drawings, in which:

FIG. 1 is a diagrammatic illustration of a survey format that is known in the prior art;

FIG. 4A is a diagrammatic illustration of a non-quantitative item with response choices having associated ordinal ranks, according to aspects of the present invention;

DETAILED DESCRIPTION

Figure 2:
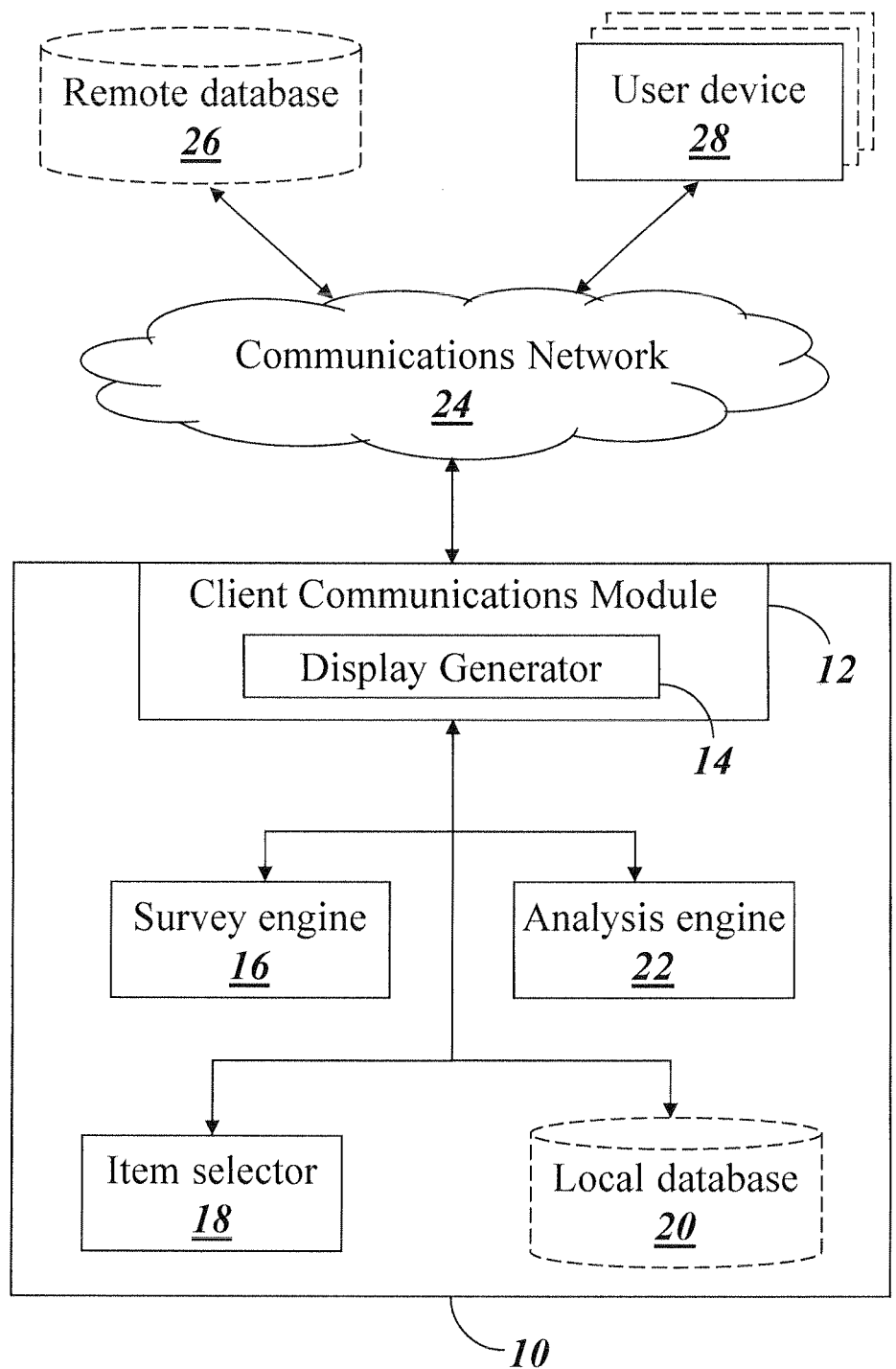
FIG. 2 is a diagrammatic illustration of a system, according to embodiments of the present invention.

An illustrative embodiment of the present invention relates to systems and methods for verifying one or more unverified items for measuring respondent positions along a continuum for a trait. The one or more unverified items can collectively form a psychometric "scale," which includes a series of such items that have particular psychometric properties, such as minimizing redundancy (among others). One, some, or all of the one or more unverified items can be non-quantitative items, e.g., can have non-quantitative response choices. In illustrative embodiments, verification of the unverified non-quantitative item is achieved by collecting responses to a survey from a plurality of users and performing acceptability analysis. The survey can include the unverified non-quantitative items as well as one or more verified quantitative items. Optionally, the one or more verified quantitative items can form a psychometric "scale." The received user responses can be used to determine whether the unverified non-quantitative scale is acceptable, based on an analysis of both (a) user selections of non-quantitative response choices for unverified non-quantitative items and (b) user selections of quantitative response choices for verified quantitative items.

FIGS. 2 through 12, wherein like parts are designated by like reference numerals throughout, illustrate example embodiments of systems and methods for verifying an unverified non-quantitative item for inclusion in a survey, according to the present invention. The present invention will now be described with reference to the example embodiments illustrated in the figures. However, it should be understood that many alternative forms can embody the present invention. One of skill in the art will appreciate a wide variety of different ways to alter the parameters of the example embodiments disclosed, such as the order of steps, combination or division of one or more steps, inclusion of more or less modules, implementation in different computing environments or systems, and the like, all in a manner still in keeping with the spirit and scope of the present invention.

Although the illustrative embodiments depicted in the figures and described herein refer to a method of verifying unverified non-quantitative items, the present invention is not strictly limited to unverified items that are non-quantitative. In fact, other unverified items alternatively or additionally may be determined acceptable and thereby verified using the systems and methods described herein. In illustrative embodiments, however, one, some, or all of the one or more unverified items included in a survey for which acceptability and verification is desired are non-quantitative items. As will be appreciated by one of skill in the art upon reading the present specification, a non-quantitative item is an item having non-quantitative response choices whose meaning is not a numerical quantity, an expression of quantity, or another quantitative value. Still other embodiments and alternatives are possible.

FIG. 2 depicts an example system 10 for performing functions and methods of embodiments of the present invention. The system 10 can be implemented, e.g., by a computing device such as the example computing device 500 depicted in FIG. 10 (for example, implemented on one or more server devices), as described in further detail herein. For example, the various engines and modules can be implemented as instructions contained in one or more non-transitory computer readable media and/or computer storage devices. The system 10 generally can include a client communications module 12, which can include a display generator 14, for generating one or more interactive displays of information, according to certain aspects of the present invention. The system 10 further can include a survey engine 16 for generating surveys according to embodiments of the present invention, and an item selector 18 for selecting one or more items to be included in the surveys. The system further can include one or more local databases 20 for storing information to be included in the one or more surveys generated by the survey engine 16. In addition, the system 10 can include an analysis engine 22 for performing verification analysis, statistical analysis, and other analyses, as described in greater detail herein. All of the modules, engines, and components of the system 10 can be logically connected and in communication with one another.

The system 10 can communicate with one or more remote databases 26 (e.g., virtual databases, cloud databases, and other remote databases) and a plurality of user devices 28 across a communications network 24 (e.g., the Internet, or any other communications network). Accordingly, although reference is made herein to a single local database 20 and a single remote database 26, one of skill in the art will appreciate that in fact, each such database 20, 26 can be implemented across multiple logically connected different databases, which can be locally or remotely coupled.

In general, the modules, engines, and components of the system 10 of FIG. 2 can be implemented as one or more instructions stored on one or more non-transitory computer readable media and/or computer storage devices. Accordingly, one of skill in the art will appreciate a wide variety of ways to modify and alter the system 10 of FIG. 2, as well as the various components with which it interacts. For example, the databases 20, 26 can be implemented according to any number of suitable database structures. Furthermore, some or all of the information contained in the local database 20 alternatively can be stored in the remote database 26. Additionally, although the modules, engines, and other components are depicted as discrete blocks and elements, in fact the system 10 may be implemented in such a way that multiple of the depicted modules, engines, or other components are implemented with just a single module, engine, or component. Similarly, in some embodiments it may be desirable to implement the system 10 using multiple iterations of the depicted modules, engines, and/or components, as would be appreciated by one of skill in the art. Furthermore, while some modules and components are depicted as included within the system 10, it should be understood that, in fact, any of the depicted modules alternatively can be excluded from the system 10 and included in a different system. One of skill in the art will appreciate a variety of other ways to expand, reduce, or otherwise modify the system 10 upon reading the present specification.

Figure 3:
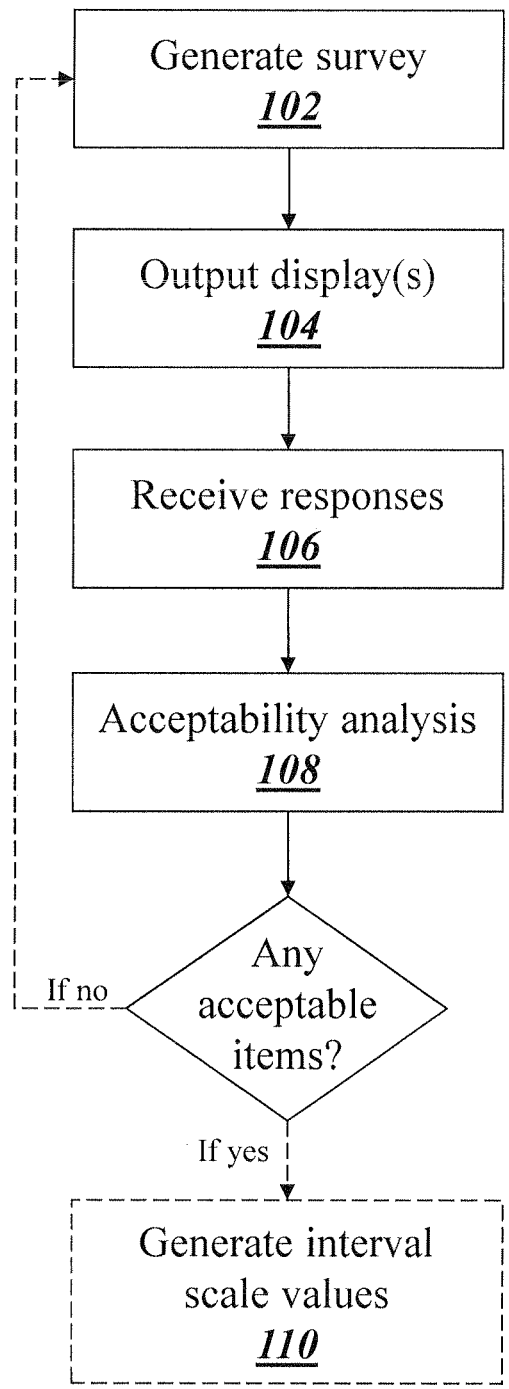
FIG. 3 is a method for determining the acceptability of and thereby verifying one or more unverified non-quantitative items by utilizing one or more verified quantitative items, according to aspects of the present invention.

FIG. 3 depicts an example method by which the system 10 can verify an item for measuring respondent positions along a continuum for a given trait. In particular, the survey engine 16 can cause one or more processors to generate a survey (step 102). For example, software sold by Qualtrics (located in Provo, Utah) can be utilized to generate the survey. Alternatively, the survey can be received and/or loaded from a database.)

The survey (e.g., generated in step 102) can include one or more verified items for measuring respondent positions along the continuum for the trait. The verified item(s) included in the survey can be existing, non-quantitative items. A "quantitative" response choice is herein defined to be a response choice that presents response choices that express quantitative values, such as numerical values (e.g., 0, 1, 2, etc.) expressions of absolute or relative quantity (e.g., "very much," "strongly agree," "often," etc.), or express other forms of quantification. As one non-limiting example, the quantitative response choices can each designate a different value on a numerical scale (e.g., "1" through "10"). Each value on the numerical scale can represent a degree to which the respondent agrees with the prompt. In some further embodiments, the verified item(s) are also non-pictorial items, e.g., those which do not include or contain any pictures. What is meant by "verified" is that the item meets one or more psychometric criteria for acceptability, as verified by empirical evidence and data collection, as would be understood by those of skill in the art. The verified item(s) can collectively form what is commonly referred to in the art as a "scale" (herein referred to as an "index," as described in greater detail below) that includes a statistically cohesive collection of verified items for measuring the degree to which respondents possess a particular trait (e.g., personality trait, purchase tendencies, demographic characteristics, etc.). The verified items generally can include a prompt accompanied by a plurality of quantitative response choices, each of which offers a different answer to the prompt. The quantitative response choices of the verified items can be represented as is conventional in the art, e.g., using text and/or quantitative response choices, as would be appreciated by one of skill in the art. Accordingly, the verified items included in survey can include quantitative response choices, textual answer choices, or other conventional response choices.

Furthermore, the survey generated in step 102 also can include one or more unverified items for measuring respondent positions along the continuum for the trait. In illustrative embodiments, at least one (e.g., some, at least some, or all) of the unverified item(s) generally can be a non-quantitative item. In yet further illustrative embodiments, every unverified item included in the survey is a non-quantitative item. As with the quantitative items, the non-quantitative item(s) that are included in the survey generally can include a prompt and a plurality of two or more non-quantitative response choices for responding to the prompt. The prompt can be at least partially or entirely text-based, at least partially or entirely audio-based, at least partially or entirely video-based, at least partially or entirely picture-based, or can be presented in any other form of media. The non-quantitative response choices included in the survey each can be non-quantitative.

In general, the non-quantitative items can include a plurality of non-quantitative response choices. Non-quantitative response choices are response choices for which there is no inherent or a priori "natural order" relative to the particular trait in respondents that is being measured. As one illustrative example, colors (e.g., blue, green, orange, yellow) have no inherent or a priori natural order for measuring "happiness." In other words, it is unlikely to know a priori (i.e., without any empirical data or testing) that any of these colors indicates a particular level of happiness, even if there is an empirical correlation between particular colors and particular levels of happiness. Nonetheless, psychiatrists may have intuitions (e.g., based on personal experience, studies, etc.) suggesting that humans in many different societies interpret the meaning of these colors uniformly, such that blue indicates less happiness, whereas yellow indicates greater happiness. Accordingly, there may be value in such non-quantitative response choices as ways to measure respondent positions along a continuum for the trait "happiness," even despite their lack of inherent or a priori natural order for measuring "happiness." Said differently, for "non-quantitative" response choices, the correlation between each response choice and the corresponding position it represents along the continuum for the particular trait that it measures is not generally known a priori, e.g., based on a "natural order" or inherent quantitative order, as would be appreciated by one of skill in the art.

In further embodiments, some or all of the non-quantitative items are pictorial. As used herein, a "pictorial" item is an item having one or more pictorial response choices whose meaning is represented primarily or entirely by one or more pictures, as would be understood by those of skill in the art. In illustrative embodiments, each pictorial response choice of each pictorial item is pictorial and further does not contain any non-pictorial content whatsoever (e.g., text, audio, etc.). In other embodiments, one or more of the pictorial response choices can have at least some non-pictorial content (e.g., accompanying text, etc.). However, in all embodiments, a "pictorial" item is one that includes pictorial response choices that each includes pictorial content that is entirely or primarily responsible for representing the meaning of that pictorial response choice. Accordingly, to the extent that non-pictorial content is included in any pictorial response choice of a pictorial item, the non-pictorial content wholly or substantially does not contribute to the meaning of the picture. Thus, the ability of respondents in distinguishing between pictorial response choices is not based on the non-pictorial content, when included in the pictorial response choices of pictorial items.

Figure 9:
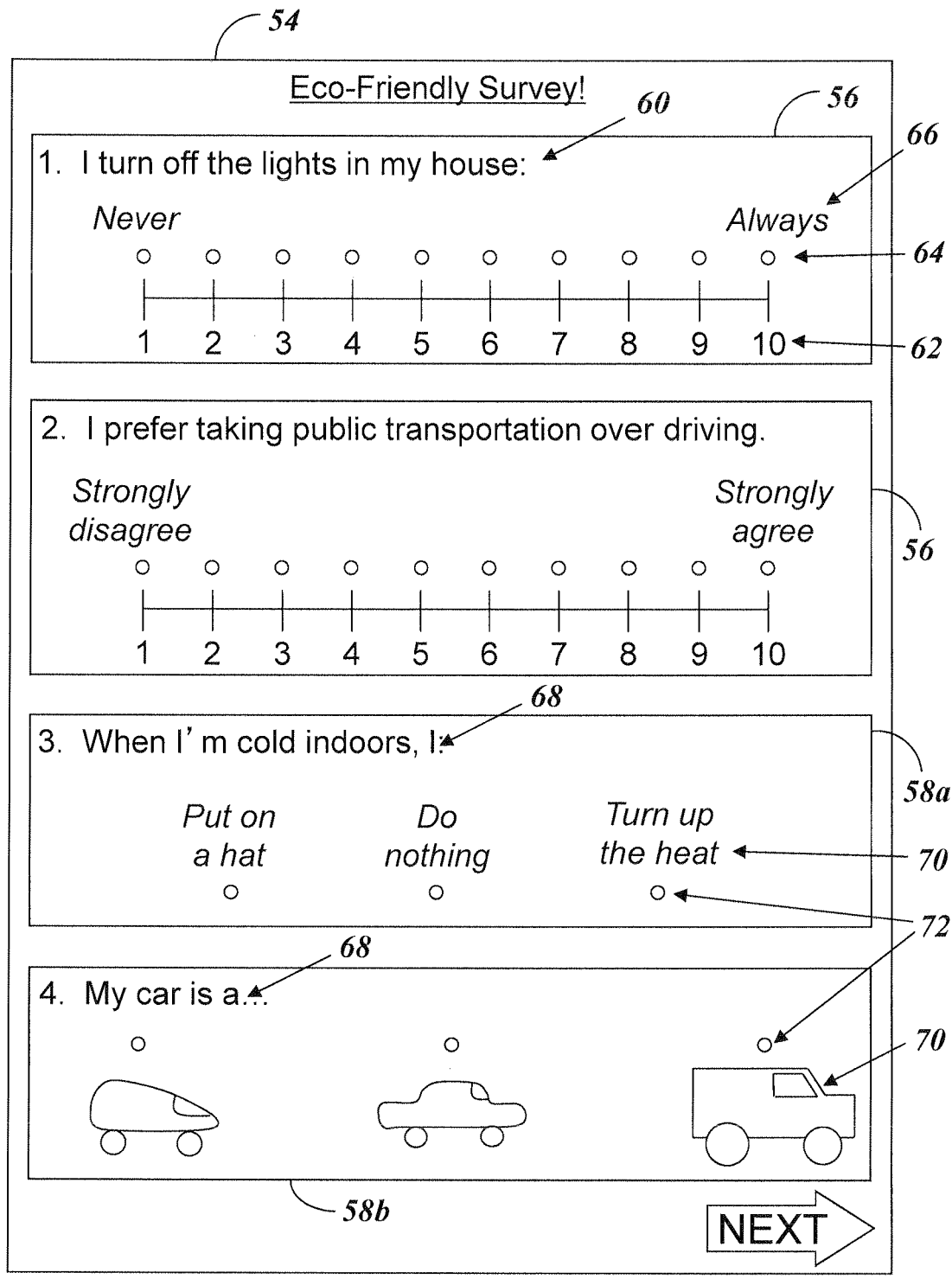
FIG. 9 is an example survey including one or more verified quantitative items and one or more unverified non-quantitative items, according to embodiments of the present invention.

For example, FIG. 9 depicts an example embodiment of an electronic display 54 presenting a survey for measuring respondent positions along a continuum for the trait of eco-friendliness. The display includes two verified quantitative items 56 and two unverified non-quantitative items 58a, 58b. The verified quantitative items 56 (numbered "1," and "2.") each include a prompt 60 and a plurality of quantitative response choices 62. In this example, the quantitative response choices 62 of the upper two verified quantitative items 56 (numbered "1." and "2.") additionally are quantitative response choices, as each quantitative response choice 62 includes a numerical quantity. The response choices 62 include selectable buttons 64. In this example embodiment, only one of the selectable buttons 64 of each verified quantitative item 60 is enabled to be selected at a time. In addition, accompanying text 66 is included for providing further indication of the meaning of the quantitative response choices 62.

Each of the unverified non-quantitative items 58a, 58b similarly includes a prompt 68 and a plurality (in this case, three) of non-quantitative response choices 70. In the example embodiment of FIG. 9, all of the plurality of non-quantitative response choices 70 are non-quantitative. The non-quantitative item 58b is pictorial, whereas the non-quantitative item 58a is non-pictorial (e.g., purely textual). For example, the pictures in the non-quantitative item 58b indicate (from left to right), a gas-electric hybrid car, a sedan, and a sports utility vehicle (SUV). Each of non-quantitative response choices 70 includes a selectable button 72. As with the verified quantitative items 56, only one of the selectable buttons 72 of each of the unverified non-quantitative items 58a, 58b is enabled to be selected at a time. Alternatively, the text/pictures itself can be made selectable.

Continuing with FIG. 3, once the survey is generated (e.g., as executed by one or more processors and commanded by the survey engine 16), the display generator 14 can cause one or more displays of information to be generated by one or more processors. The displays can include and present the survey. The client communications module 12 can cause the one or more displays to be output through at least one output device (step 104). For example, the displays can be implemented as a series of documents (e.g., linked web pages) that are accessible to one or more clients (e.g., web browsers) on the user devices 28 (e.g., personal computers) at one or more network locations (e.g., URLs). Accordingly, as the surveys are included and presented in one or more displays, one of skill in the art will appreciate that the step 102 of generating the survey more specifically can include generating the survey within the one or more displays that are output in step 104. Alternatively, the survey can be generated in the step 102, e.g., as a compilation of entries in a database for use in a later step of generating the displays presenting the survey. Many other ways of creating, and optionally storing, the surveys will be appreciated by one of skill in the art upon reading the present specification. All such alternatives are contemplated within the scope of the present invention.

In general, for each unverified non-quantitative item, the non-quantitative response choices can have associated values that form what is referred to in psychometrics as an "ordinal scale." In particular, in a psychometric ordinal scale, the non-quantitative response choices have ranks (e.g., first, second, etc.) that indicate a particular order of the non-quantitative response choices relative to one another. Accordingly, as used herein, an "ordinal rank" is a rank of a response choice within a psychometric ordinal scale. In illustrative embodiments, the positions of the non-quantitative response choices in the one or more displays are ordered according to the ordinal ranks of the non-quantitative response choices. Said differently, the non-quantitative response choices are displayed in the rank order for the psychometric ordinal scale. In some embodiments, the rank order of the non-quantitative response choices are based on an initial intuition, guess, or estimation of a rank order that would be likely to result in the unverified non-quantitative item being an acceptable measure of the first trait. For example, the rank order can be manually input by a system administrator based on the particular respondent positions that the system administrator believes are represented by the non-quantitative response choices, and further based on an order in which the system administrator believes those respondent positions lie along the continuum for the first trait. Said differently, the non-quantitative response choices of an unverified non-quantitative item can be placed in an initial rank order (and thus each non-quantitative response choice can be assigned an ordinal rank) that indicates a presumed order on the continuum of the presumed respondent positions represented by the non-quantitative response choices. Alternatively, the rank order on which the order of non-quantitative response choices are based can be arbitrarily and/or randomly assigned (e.g., automatically, by a method performed by one or more processors).

Accordingly, a plurality of different users operating the user devices 28 can access the one or more electronic displays presenting the survey and complete the survey, which includes the unverified non-quantitative item and its non-quantitative response choices positioned in an order equivalent to the assigned rank order. The one or more displays presenting the survey can be interactive displays, such that the response choices (non-quantitative and quantitative) are selectable. Thus, each user accessing the displays and the survey included and presented thereby are enabled to select displayed response choices conforming to the user's preferences, beliefs, etc., such that the user's position along the continuum for the trait may be attempted to be measured.

One of skill in the art will appreciate that there are many ways to make the response choices selectable within the electronic display. For example, in some embodiments, the non-quantitative content is selectable. In other embodiments, the non-quantitative content includes a selectable button (e.g., a filled or unfilled circle, and any other selectable button) that is displayed and presented in conjunction with the non-quantitative content. (In such embodiments, the selectable button includes non-quantitative content, quantitative content, or both, as the button does not contribute to or elucidate the meaning of the non-quantitative content.) In general, selection can take any form, including, as illustrative examples, clicking (single-clicking, double-clicking, etc.) hovering (e.g., "mouse over"), keystrokes, voice command, joystick control, remote control, touch screen gestures/commands, or any other selection mechanism, e.g., received through an input device. One of skill in the art will appreciate that embodiments of the present invention are not so limited to specific types of selection.

The displayed items can all be included in a single electronic display, or can be distributed among several displays, e.g., for which links are provided in the form of navigational buttons ("Back," "Next," etc.).

Returning to FIG. 3, by accessing, completing (e.g., by selecting a response choice for each of the displayed items), and submitting responses to the surveys, a plurality of users can submit a plurality of responses. The plurality of responses to the survey can be transmitted over the communications network 24 and received by the client communications module 12 through at least one input device (step 106). The plurality of responses can be received from a plurality of users (also considered to be "respondents" of the survey once they complete and electronically submit the survey). In illustrative embodiments, each response to the survey by a user includes that user's selection of a response choice for each and every item (quantitative and non-quantitative) in the survey. In other embodiments, however, users may be allowed to leave one or more of the items in the survey blank (i.e., not make a selection of any of the response choices for a particular item).

For example, in accordance with one embodiment of the present invention, the Mechanical Turk software (sold by Amazon.com, Inc., located in Seattle, Wash.) can be used to collect and/or organize data from users based on user responses to the survey.

The analysis engine 22 can cause one or more processors to perform acceptability analysis on some or all of the received responses (step 108). The analysis, as described in further detail herein, generally includes one or more statistical analyses that leverage user selections for the verified quantitative items in order to confirm or deny that the unverified non-quantitative item(s) is an acceptable measure of the trait. For example, as one non-limiting example, the acceptability analysis step 108 can include determining one or more statistical characteristics (e.g., validity, reliability, etc.) of the unverified non-quantitative items based on user selections for both the verified (e.g., quantitative) and the unverified non-quantitative items, and determining whether the one or more statistical characteristics of the unverified non-quantitative items meet one or more predetermined (e.g., psychometric) criteria for acceptability.

One of skill in the art will appreciate that there are many different ways and schedules for performing steps 106 and 108. For example, the survey can be accessible for completion for a predetermined amount of time, such that the acceptability analysis performed in step 108 occurs after a predetermined amount of time has expired. As another possibility, the verification analysis can be performed in step 108 upon receiving a predetermined amount of responses or data. As yet another option, the verification analysis can be performed in step 108 in periodic intervals (e.g., as daily updates) while the survey continues to be made accessible to users, or can be performed continuously (e.g., as updates) when a new response is received from a user. Accordingly, and in general, the verification analysis performed in step 108 can begin immediately, after a predetermined amount of time, or upon receiving at least a predetermined number of responses (e.g., to improve the sample size), or upon meeting any other criterion.

If any of the unverified non-quantitative items are determined to be acceptable, then interval scale values optionally can be generated for one, some, or all of the acceptable unverified non-quantitative items (step 110). As used herein, an "interval scale value" is a value that forms what is referred to in psychometrics as an "interval scale." Specifically, an "interval scale value" is a value in a set of values that indicates not only an ordinal rank but also a degree of relative similarity/difference in comparison to interval scale values of other response choices based on quantitative differences in the interval scale values. In further embodiments, the quantitative differences between any two subsequent interval scale values is the same, such that the resulting response choices are depicted as separated by equal intervals of space. In illustrative embodiments, an interval scale value is generated for each of the non-quantitative response choices for all of the unverified non-quantitative items determined to be acceptable. Each of these generated interval scale values can be associated with its corresponding non-quantitative response choice, e.g., in a database, such that the future scoring of respondents based on the non-quantitative item utilizes the generated interval scale values (e.g., rather than the ordinal ranks).

The step 110 of generating interval scale values can include performing one or more regression analyses (e.g., linear or nonlinear) on one or more datasets created from the plurality of responses received in step 106. In illustrative embodiments, the interval scale values are derived at least in part based on the ordinal ranks of the non-quantitative response choices, as well as the plurality of selections received from the plurality of users. Accordingly, the ordinal values can be effectively "replaced" (e.g., at least in function) by the newly generated interval scale values. However, it will be appreciated by one of skill in the art that in actuality, the ordinal values can remain stored as data if so desired, and need not be deleted, removed, or replaced on a computer readable storage device.

Optionally, if none of the unverified non-quantitative items are determined to be acceptable, then steps 104 through 108 can be repeated until at least one acceptable non-quantitative item is determined. In one example embodiment, data and/or results received from users can be analyzed in step 108 using SPSS software (sold by IBM, located in Armonk, N.Y.).

Accordingly, using the method depicted in the example embodiment of FIG. 3, an unverified non-quantitative item can be determined to be acceptable by the system 10 and can be provided with interval scale values for generating a psychometric interval scale. For example, FIG. 4A depicts an example interactive display of a non-quantitative item 30 and a plurality of non-quantitative response choices 34 to the non-quantitative item 30, which are ordered along a psychometric ordinal scale for measuring respondent positions along a continuum for the trait "healthiness." Each of the non-quantitative response choices 34 can be selectable on the display. In addition to the plurality of non-quantitative response choices 34, the non-quantitative item 30 also includes a prompt 32 ("My favorite food is . . . "). Each non-quantitative response choice 34 includes a selectable button 38 and is accompanied by text 40 ("This!").

In the example embodiment of FIG. 4A, the non-quantitative item 30 includes five non-quantitative response choices 34 (from left to right, an apple, a banana, a sandwich, a slice of pizza, and ice cream), each of which has an ordinal rank and thus form a psychometric ordinal scale (1st, 2nd, 3rd, 4th, and 5th, respectively). These values can be stored in a database, as represented schematically by the example database entries 33. Specifically, the database entries 33 include unique identifiers 35, which uniquely identify the non-quantitative response choices 34. The unique identifiers 35 are each depicted schematically as pictures for clarity. However, the unique identifiers 35 can be stored in the databases 20, 26 as one or more strings, etc. In addition, the database entries 33 include an ordinal rank value 37 for each of the non-quantitative response choices 34, which represents the ordinal rank of the corresponding non-quantitative response choice 34. In this example, the positions of the non-quantitative response choices 34 on the display are spaced at even intervals, and are associated only with ordinal ranks.

Figure 4B:
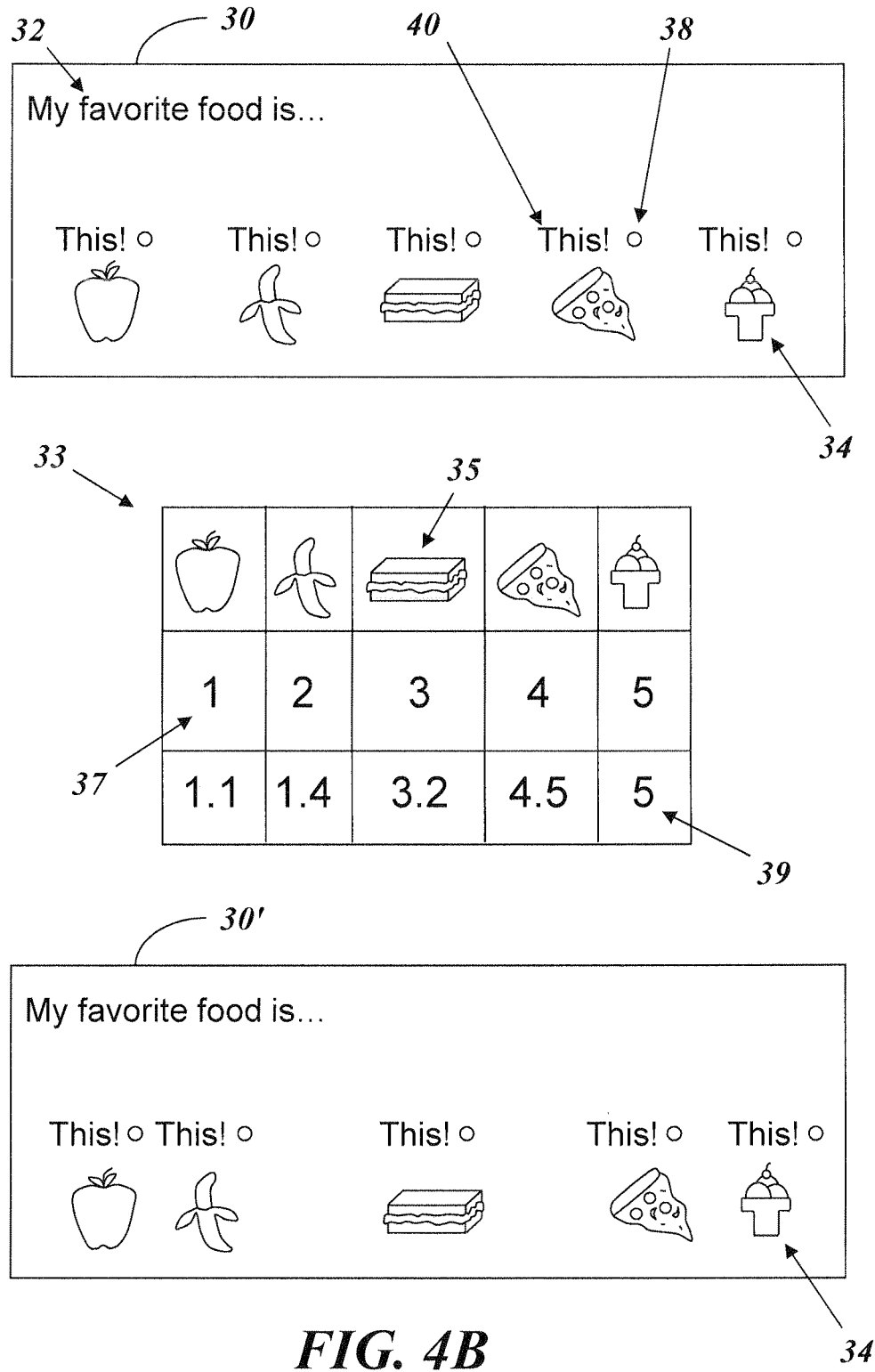
FIG. 4B is a diagrammatic illustration of the non-quantitative item of FIG. 4A, with the response choices having associated interval scale values, according to aspects of the present invention.

In FIG. 4B, the non-quantitative item 30 of FIG. 4A now forms an "interval scale," such that the displayed non-quantitative response choices 34 correspond to interval scale values 39, which similarly can be stored in the databases 20, 26. Thus, differences in value between the interval scale values 39 of the non-quantitative response choices 34 indicate degrees of similarity/difference between the non-quantitative response choices 34. In illustrative embodiments, the intervals of space between the plurality of non-quantitative response choices 34 is equal, as depicted by the non-quantitative item 30 in FIG. 4B. However, in other embodiments, such as the non-quantitative item 30' also depicted in FIG. 4B, intervals of space on the display are based on (e.g., proportional to) the interval scale values. For example in the alternative non-quantitative item 30' of FIG. 4B, the apple now appears closer to the banana, and the slice of pizza now appears closer to the ice cream, thus indicating that the apple and the banana represent more similar choices in gauging respondent positions along the continuum for the trait "healthiness."

One of skill in the art will appreciate that in general, there are many ways to visually depict the non-quantitative item 30 forming an interval scale, including, as non-limiting examples: (a) providing spacing between non-quantitative items 34 that is based on the ordinal ranks 37, (b) providing spacing between non-quantitative items 34 that is based on the interval scale values 39, and (c) providing spacing between non-quantitative items 34 that is based on the interval scale values 39 and further that spatially indicates the relative similarity/difference, etc.

Figure 5:
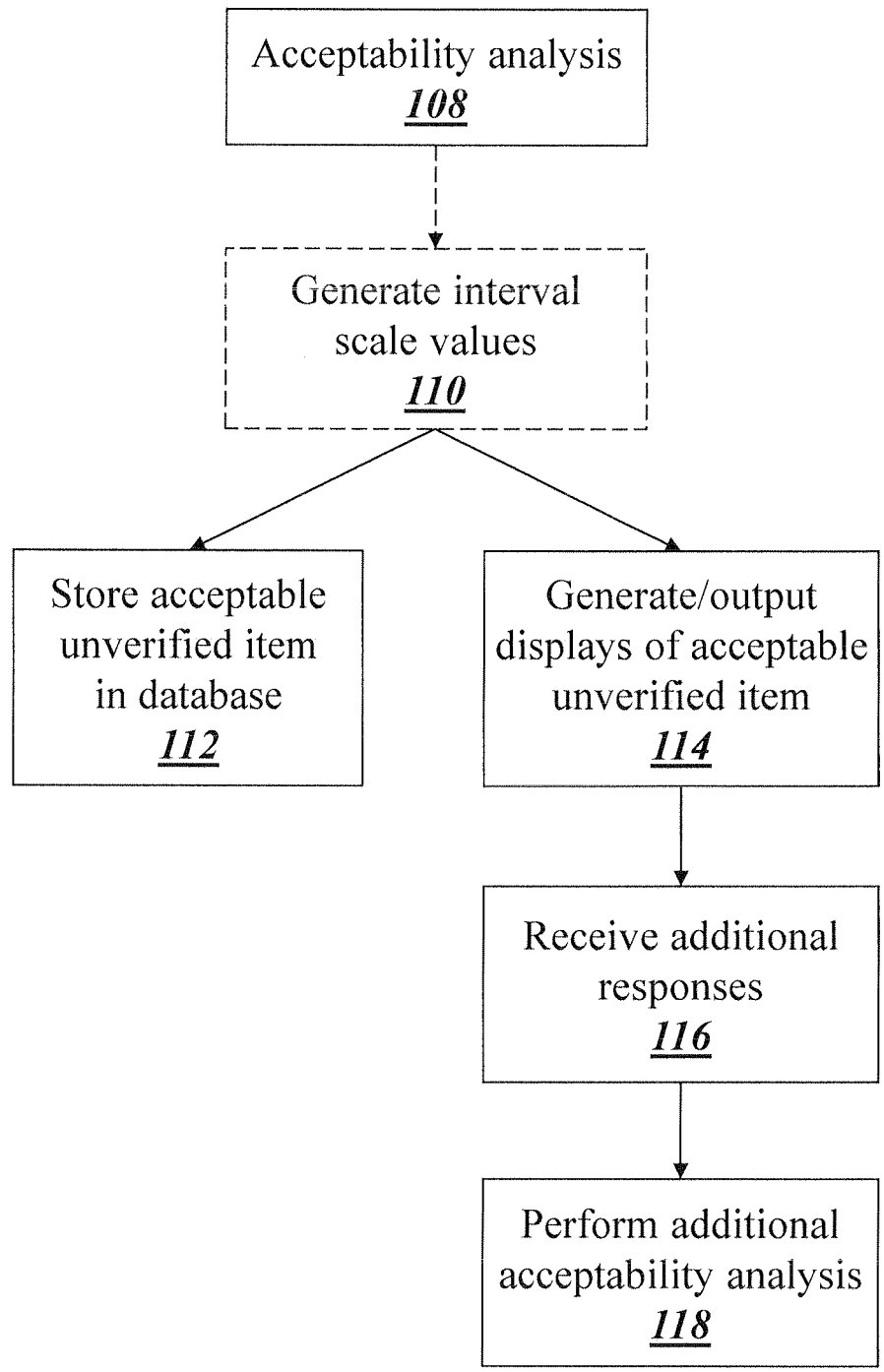
FIG. 5 is a method of further utilizing an unverified non-quantitative item determined to be acceptable and thereby verified, according to aspects of the present invention.

Accordingly, once an unverified non-quantitative item is confirmed to meet one or more (e.g., psychometric) standards of acceptability and thereby verified (e.g., in step 108), the non-quantitative item can be utilized in a number of different ways. For example, FIG. 5 depicts two illustrative examples of methods for utilizing a non-quantitative item that has been determined by the system 10 to be acceptable and has thereby been verified. In one embodiment, such a non-quantitative item that has been determined to be acceptable is stored in a database (step 112), such as the local database 20 or the remote database 26, e.g., in such a way as to form the database entries 33 that enable future use of the non-quantitative item for measuring respondent positions along the continuum for the trait. In general, the non-quantitative item determined to be acceptable (and/or its associated interval scale values) can be organized and/or categorized as would be appreciated by one of skill in the art (e.g., using tags or other metadata, indexing, etc.). Furthermore, the non-quantitative item determined to be acceptable can be stored in the database 20, 26 as any form of data, including an image file, a web page or other document, an interactive (e.g., tillable) PDF document, as table entries in a database, and/or in any other data format. For example, the data format can include one or more image files in which the non-quantitative item determined to be acceptable is stored in the form depicted in the example embodiments of FIGS. 4A and/or 4B.

Furthermore, in embodiments where interval scale values are generated in step 110, the non-quantitative items determined to be acceptable can be included in further displays in which the non-quantitative response choices are presented on a psychometric interval scale for further data collection (step 114). (In particular, the display generator 14 can cause one or more processors to generate the further displays, and the client communications module 12 can cause at least one output device to output the further displays.) For example, the further displays generated and output in step 114 can present the non-quantitative item determined to be acceptable as a psychometric interval scale to collect data for verifying the acceptability of the non-quantitative item when respondent scores are determined based on the generated interval scale values for the non-quantitative response choices generated in step 110.

Accordingly, as with the displays output in step 104, the one or more further displays output in step 114 also can include one or more verified quantitative items for serving as "benchmarks." Said differently, the verified quantitative items effectively can serve as a psychometrically acceptable point of reference of true respondent positions along the first continuum for the first trait, against which user responses to the non-quantitative item can be assessed in further acceptability analysis.

In illustrative embodiments, the verified quantitative items included by the system 10 the displays in step 114 are the same as the verified quantitative items included by the system 10 in the previous displays in step 104. As with the previous displays from step 104, the additional displays in step 114 can be interactive, e.g., such that each response choice (non-quantitative and quantitative) is selectable.

As with the previous displays, the one or more further displays can be accessed, completed, and submitted by users as previously described herein. The user responses can be transmitted back to the system 10. In particular, the client communications module 12 can receive a plurality of additional responses from a plurality of users (e.g., the same as or different from the previous plurality of users) through at least one input device (step 116). The analysis engine 22 can cause one or more processors to perform the same or different acceptability analysis on the plurality of additional responses as is performed in step 108. The acceptability analysis performed in step 118 can be used to confirm or deny that the unverified non-quantitative item previously determined to be acceptable when respondent positions are scored based on the interval scale values generated in step 110 for the non-quantitative response choices.

Figure 6:
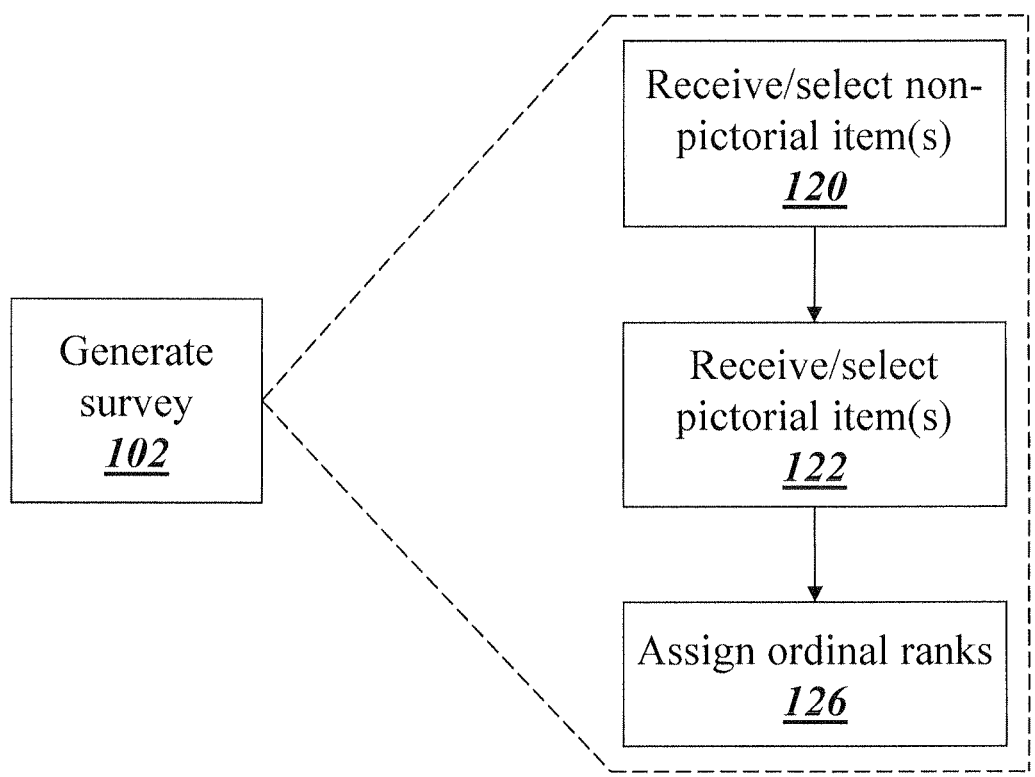
FIG. 6 is a method for generating a survey, according to aspects of the present invention.

Referring now to FIG. 6, one example method for executing the step 102 of generating the survey will be described in greater detail. The system 10 can receive or select one or more quantitative verified items for inclusion in the survey (step 120). For example, the client communications module 12 can receive, through at least one input device, the one or more verified quantitative items (e.g., from a system administrator communicating with the system 10 over the communications network 24, etc.). Alternatively, the item selector 18 can cause one or more processors to select the one or more verified quantitative items from the local database 20 and/or the remote database 26. Furthermore, the system 10 can receive or select one or more unverified non-quantitative items for inclusion in the survey (step 122). For example, the client communications module 12 can receive, through at least one input device, the one or more unverified non-quantitative items, e.g., from a system administrator. Alternatively, the item selector 18 can cause one or more processors to automatically select one or more unverified non-quantitative items from the local database 20 and/or the remote database 26.

Continuing with FIG. 6, the survey engine 16 can assign the ordinal rank to each of the non-quantitative response choices, e.g., for use in later determining the positions and order in which the non-quantitative response choices are presented in the displays. In some alternative embodiments, rather than the system 10 assigning the ordinal ranks in the step 126, system 10 can receive the ordinal ranks for the non-quantitative response choices, e.g., from a system administrator communicating with the system 10. As yet another embodiment, the ordinal ranks can be pre-created and stored in one or more of the databases 20, 26 and retrieved by the item selector 18.

Figure 7:
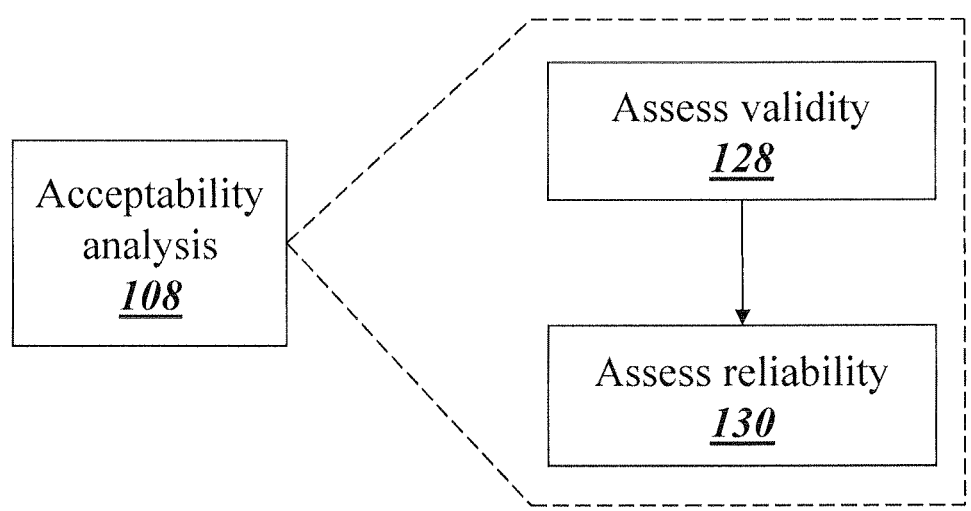
FIG. 7 is a method for performing acceptability analysis, according to aspects of the present invention.

FIG. 7 depicts an example method for executing the step 108 of performing acceptability analysis. The example analyses depicted in the steps of FIG. 7 can be applied to individual unverified non-quantitative items included in the survey, for which user selections of non-quantitative response choices were received in step 106, and can be applied for any or all unverified non-quantitative items for which acceptability analysis is desired to be conducted. Alternatively or additionally, the analyses of FIG. 7 can be applied in such a way that a plurality of unverified non-quantitative items are assessed as a statistically cohesive group, commonly referred to in psychometrics as a "scale." However, to avoid confusing such "scales" (which comprise a statistically cohesive group of items) with psychometric "scales" formed of a plurality of response choices (e.g., as with a psychometric interval scale or a psychometric ordinal scale), such a statistically cohesive group or collection of items is herein referred to as an "index." Accordingly, an index of unverified non-quantitative items can be determined to meet one or more psychometric standards of acceptability.

Typically in psychometrics, responses to an index are evaluated for acceptability in aggregate by simply summing either the ordinal ranks or the interval scale values associated with the received response choices. Such summation-based aggregations can be used in embodiments of the present invention for evaluating the indexes of unverified non-quantitative items, as will be appreciated by one of skill in the art upon reading the present specification. However, it should also be appreciated that in embodiments provided herein, indexes can additionally or alternatively be evaluated based on many other types of aggregation functions, which will be appreciated by one of skill in the art.

As depicted in FIG. 7, the acceptability analysis performed in step 108 specifically can include the system 10 determining and assessing one or more statistical characteristics of the unverified non-quantitative item. In illustrative embodiments, the analysis engine 22 causes one or more processors to determine and assess the validity of the unverified non-quantitative item(s) (step 128). For example, validity can be determined in step 128 by calculating statistical correlation between the received user selections for verified items and the received user selections for the particular unverified item(s) being analyzed, as would be appreciated by one of skill in the art. Furthermore, a factor analysis can be conducted in order to determine whether, based on the received user selections, the non-quantitative response choices of the unverified non-quantitative item map onto the quantitative response choices of the verified quantitative items in an acceptable manner. For example, the factor analysis can impose certain requirements, including (as non-limiting examples): (a) the factor structure of the verified quantitative items must be maintained by the unverified non-quantitative item, (b) the unverified non-quantitative item must map onto the same dimension(s) of the verified quantitative items, and (c) the unverified non-quantitative item and the verified quantitative items must all map onto the same factor(s) with sufficiently high extraction values and factor loadings for all of the unverified non-quantitative items. One of skill in the art will appreciate yet other ways to determine psychometric acceptability upon reading the present specification.

In addition to assessing validity, the analysis engine 22 causes one or more processors to determine and assess the reliability (step 130) of the unverified non-quantitative item (s), as would be appreciated by one of skill in the art. Furthermore, in embodiments where multiple unverified non-quantitative items are being analyzed as an index, the reliability of the plurality of unverified items can be statistically assessed as a collection (e.g., using one or more aggregation functions). In illustrative embodiments, any unverified non-quantitative items of the index that are determined to be statistically weak or redundant can be discarded. For example, a value of Cronbach's alpha can be determined for the set of unverified non-quantitative items being analyzed, to identify unverified non-quantitative items that do not greatly reduce the value of Cronbach's alpha when eliminated. Such statistically weak or redundant items that do not greatly contribute to the value of Cronbach's alpha can be discarded, removed from the set, left unselected during later stages of processing, etc. In illustrative embodiments, a minimal reliability criteria for Cronbach's alpha is imposed of $\alpha > 0.7$ in order for a set of unverified non-quantitative items to be acceptable as an index. This value is illustrative and represents a particular accepted standard within academic psychometric literature. One of skill in the art, however, will appreciate that other criteria and values are possible, depending on the particular desired applications, reliability, etc. For example, the item information can be determined and assessed, such that any items in the index with low information are discarded. In general, the particular ways of performing the reliability assessment of step 130 can be based on the goal of maximizing the value of alpha with as few unverified non-quantitative items as possible.

Optionally, steps 128 and 130 can be performed simultaneously and can be conducted on the same set of unverified non-quantitative items. As an alternative, the analyses performed in steps 128 and 130 can operate in an iterative manner. For example, the step 130 of assessing reliability can be performed on only those unverified non-quantitative items that were determined to satisfy one or more predetermined criteria for validity in step 128. As yet another possibility, the order of steps 128 and 130 can be switched, and step 128 of assessing validity can be performed on only those unverified non-quantitative items that were determined to satisfy one or more predetermined criteria for reliability in step 130.

Figure 8:
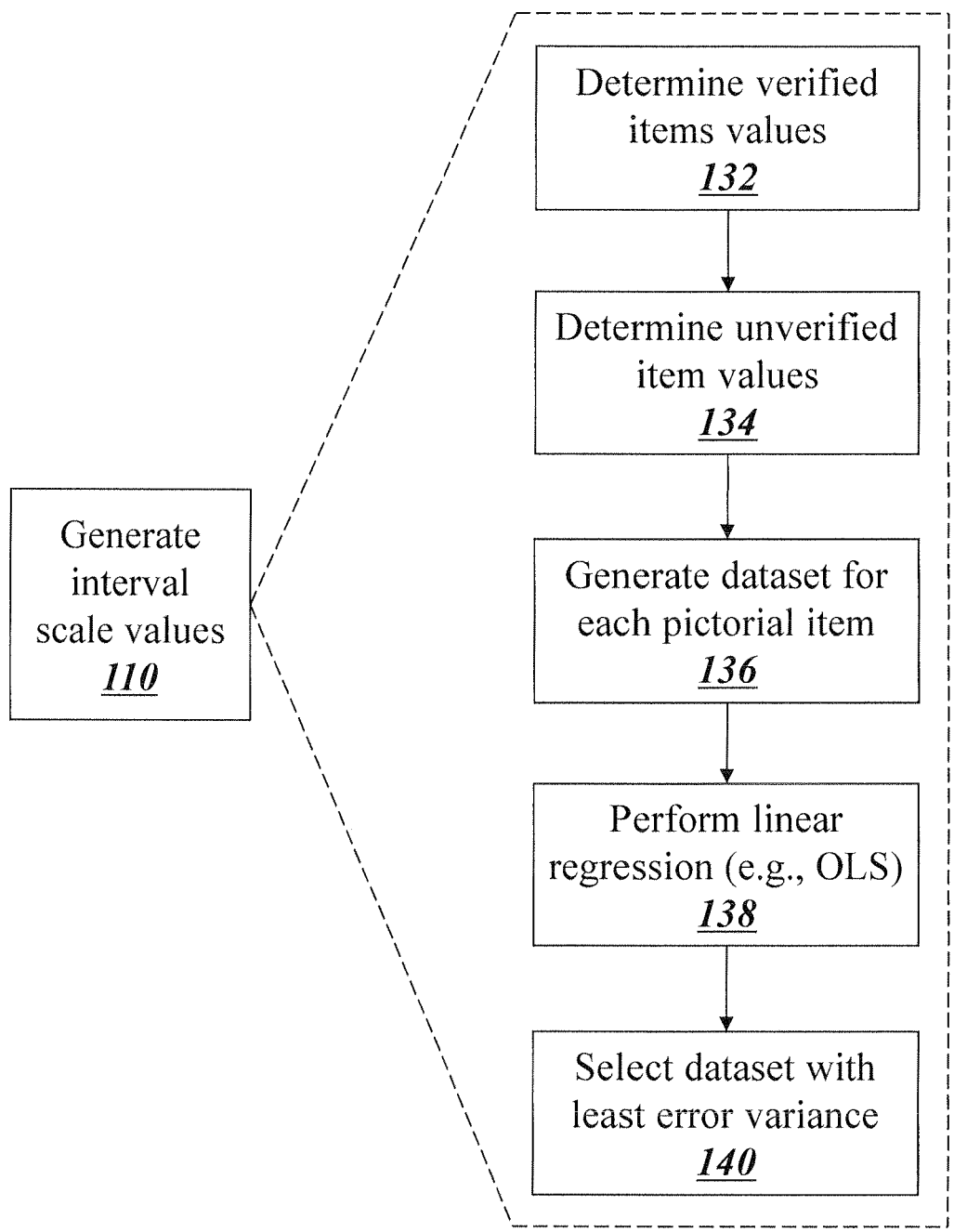
FIG. 8 is a method for generating interval scale values, according to aspects of the present invention.

FIG. 8 depicts in greater detail an example method for performing the step 110 of generating interval scale values for a set of non-quantitative response choices of a particular non-quantitative item determined to be acceptable for which the non-quantitative response choices are assigned ordinal ranks. FIG. 8 will now be described with reference to a single non-quantitative item determined to be acceptable in step 108. However, it should be understood that the process of FIG. 8 can be performed for at least one, some, or all of the unverified non-quantitative items that are confirmed as acceptable in step 108.

In particular, for each user for which a response was received containing a selection of the verified quantitative item(s), the analysis engine 22 can cause one or more processors to determine a verified items value for that user (step 132). The verified items value for a given user is based on the responses received from the user in step 106 for the verified quantitative item(s). For example, in an illustrative embodiment where each verified item is a quantitative item and each quantitative response choice thereof is a quantitative response choice, such as a numerical value (e.g., a positive integer value between 0 and 10, 1 and 10, etc.), the verified items value for each user is an average of all values selected by that user in responding to all or some predetermined subset of the verified quantitative items presented in survey. As a possible alternative to utilizing an average function, a summation function could also be used. For example, the verified items value for each user can be equal to a sum of all values selected by that user in responding to all or some predetermined subset of the quantitative items presented in survey. One of skill in the art will readily appreciate many other ways to formulate the verified items value.

Accordingly, in step 132, a plurality of verified items value can be determined for a plurality of users from which responses were received in step 108 containing selections of verified quantitative items. Furthermore, an unverified item value can be determined for users that submitted responses containing a selection for the particular unverified non-quantitative item being subjected to the acceptability analysis (step 134). In an illustrative embodiment, the unverified item value for a particular user is equal to the ordinal rank of the non-quantitative response choice selected by that user for that particular unverified non-quantitative item.

Thus, upon completing the steps 132 and 134, verified items values and unverified item value have been determined, preferably only or at least for any user for which the system 10 received (in step 106) a response containing a selection of both: (a) a non-quantitative response choice for the particular unverified non-quantitative item for which interval scale values are being generated, and (b) quantitative response choices for every (or at least a predetermined subset) of the verified quantitative items.

Accordingly, in defining the verified items values and the unverified item values in steps 132 and 134, a dataset can be generated for the particular non-quantitative item for which interval scale values are being generated (step 136). For example, the dataset can include a data point for each of a plurality of users. The data point can be expressed in a two-dimensional space, e.g., and thus in illustrative embodiments can be defined to have an x value and a y value. For each user of the plurality of users, the x value can be that user's determined unverified item value, and the y value for that user can be the user's determined verified items value.

Continuing with FIG. 8, regression analysis can be performed on the dataset (step 138). In some embodiments, the regression analysis is linear. Alternatively, the regression analysis can be non-linear regression analysis. In illustrative embodiments, a novel ordinary least squares (OLS) method (e.g., linear regression analysis) is used to generate a best fit line for the dataset. In large respondent pools, many different data points will exist for each response choice, and thus the dataset will include numerous different points having identical x values but different y values (e.g., visually depicted as vertical stacks of data points above each hash mark on the x axis in the graph of FIG. 11). Accordingly, as will be appreciated by one of skill in the art, the OLS method (or other regression analyses) can be utilized for more complex datasets in such a way that can effectively select a single y value for each x value represented in the dataset (e.g., in a weighted manner that depends upon the entire dataset).

Figure 11:
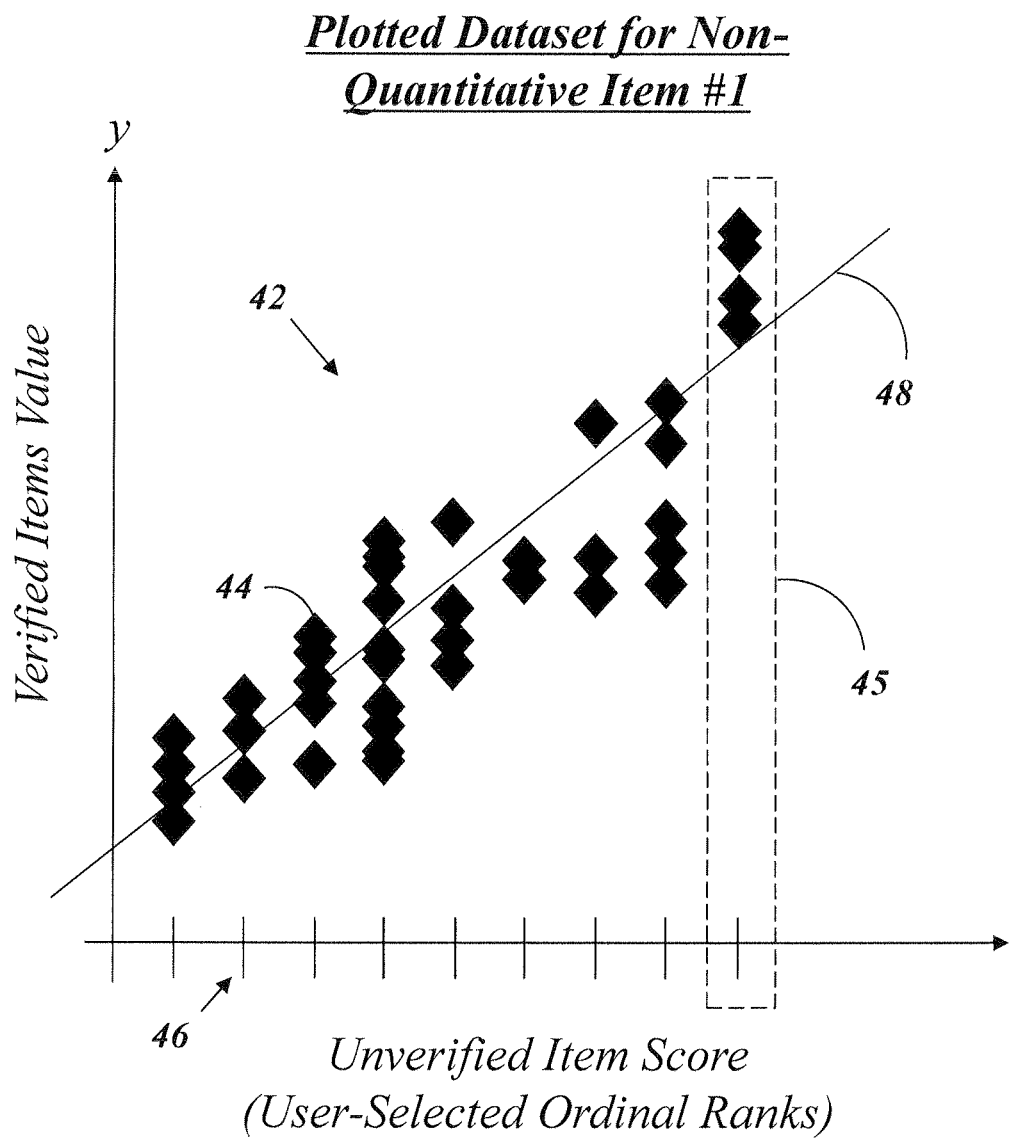
FIG. 11 is a diagrammatic illustration of a plotted dataset for an example non-quantitative item, according to aspects of the present invention.
Figure 12:
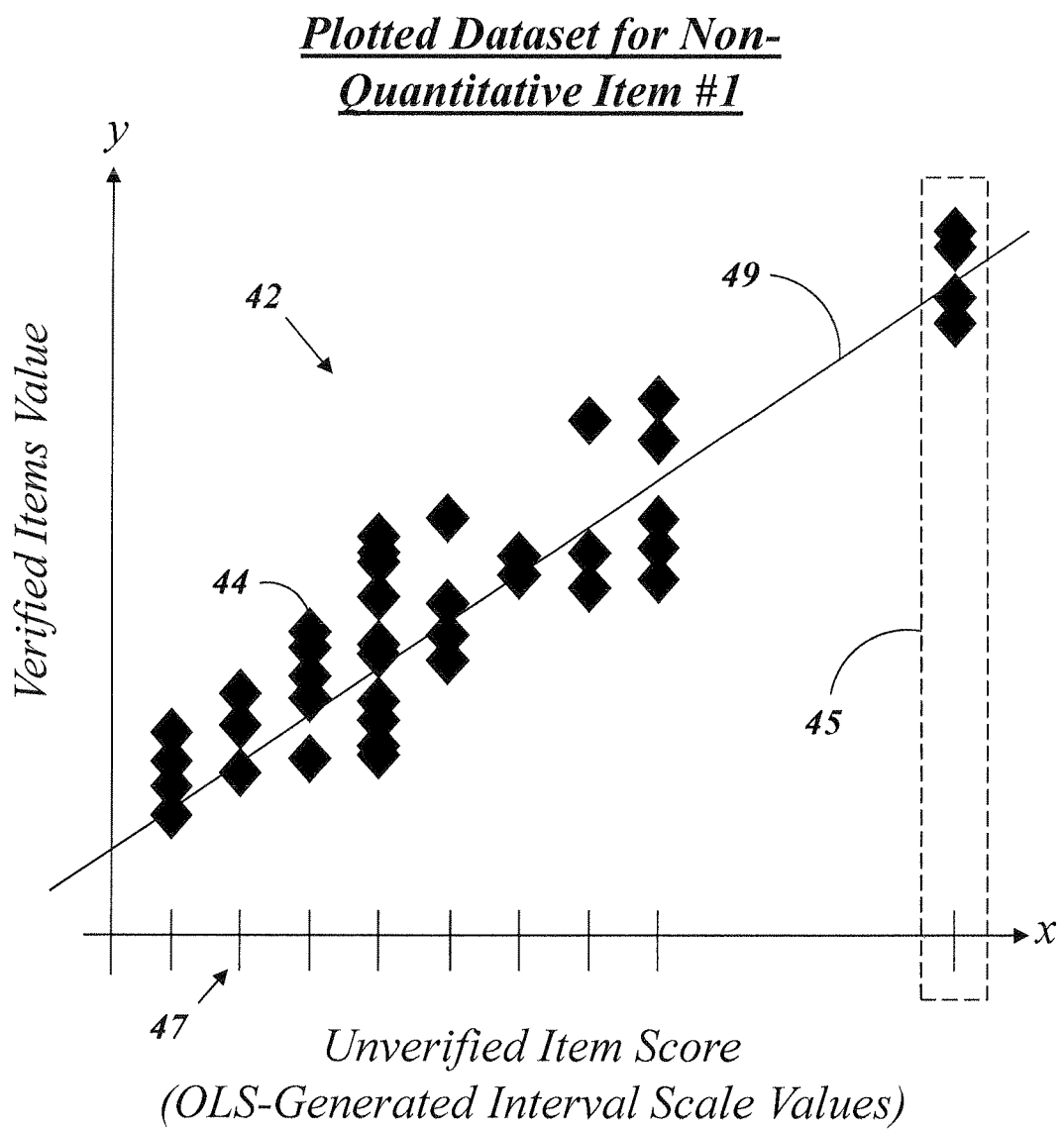
FIG. 12 is a diagrammatic illustration of the plotted dataset of FIG. 11, subsequent to undergoing one or more x-value substitutions, according to further embodiments of the present invention.

In illustrative embodiments, the ordinary least squares (OLS) method is utilized in the following novel way, which will now be described with reference to FIGS. 11 and 12. FIG. 11 depicts an example of a dataset generated in step 136, which is visualized for illustration purposes as a plot 42. As depicted in the example of FIG. 11, data for a plurality of different users is graphed for an example unverified non-quantitative item named "Non-quantitative Item #1." Each diamond-shaped data point 44 represents a determined unverified item value and a determined verified items value for a particular user. In addition, tics 46 along the x axis indicate different ordinal ranks of eleven different possible non-quantitative response choices for non-quantitative Item #1.

FIG. 11 also depicts an example of a best fit line 48 generated in step 138. Specifically, step 138 generates an equation that defines the best fit line 48. In addition to performing the fitting analysis and minimization algorithm, the OLS method varies the x position of the vertical "stacks" of data points in the dataset as visualized in the plot 42. Visually, this effectively enables each stack to "slide" along the x axis during the fitting process. Mathematically, the minimization algorithm performed by the OLS method introduces x-value substitution (e.g., modification of unverified item scores) as an additional factor that can be varied when minimizing the error variance between the determined best fit line and the dataset.

Accordingly, when performing the novel OLS method, the system 10 causes one or more processors to cycle through (e.g., substitute) a plurality of new x values in the dataset for one or more existing x values, and determine a set of substituted x values that results in the smallest summed residuals between the dataset and the best fit line (i.e., minimizes error variance). More specifically, the novel OLS method of further illustrative embodiments involves the analysis engine 22 causing one or more processors to perform the following steps: (a) substitute in a new x value for each of one or more existing x values in the graph to generate a modified dataset; (b) identify the best fit line for the generated modified dataset; (c) repeat steps (a) and (b) until a sufficient number of different modified datasets and corresponding best fit lines are obtained; and (d) compare the generated best fit lines and select the one having the lowest associated error variance. In illustrative embodiments, the substitution analysis does not result in the initial rank order of the response choices being changed. Accordingly, in such illustrative embodiments, the substituted values of x are constrained to lie between the x values of adjacent vertical stacks of data points. However, in alternative embodiments, the substituted values of x are not so constrained, and can entail modifications that effectively change the rank order of the response choices represented by the dataset.

For example, returning to FIG. 11, it is clear by visual inspection that in the depicted example, the x values increase somewhat linearly with y, up until a last x value (i.e., unverified item score) is reached. At this point, the verified items value jumps higher than previous y-value intervals between adjacent positions along the x axis. This can be visually seen by noting that the dataset 42 includes a rightmost vertical stack 45 of data points that experiences a higher increase in y relative to its immediately preceding stack than any other vertical stack of data points relative to their immediately preceding stack. Accordingly, in such further illustrative embodiments, the OLS method performs a series of substitutions for one or more particular existing x values with a plurality of new x values, and determines which combination of substitutions enables a best fit line to be generated that minimizes error variance. In the simplified example of FIG. 11, the OLS method results in a determination that error variance in the best fit line 48 is reduced by "sliding" the rightmost vertical stack 45 of data farther to the right, as depicted in FIG. 12. This results in a different best fit line 49 that can be compared to the best fit line 48 of FIG. 11. Mathematically, in the OLS method, the system 10 causes one or more processors to substitute a series of new x values for the x value of "9." For example, the OLS method can substitute an x value of "10," "10.1," "10.2," . . . "11," . . . "15," etc. for every data point having an x value of "9," and subsequently perform an OLS minimization analysis to determine a best fit line for each substituted x value. The analysis engine 22 furthermore can cause one or more processors to determine which of these x-value substitutions produced a best fit line having the lowest associated error variance.

Optionally, the OLS method simultaneously can produce modified datasets characterized by just one x-value replacement/substitution, or more than one x-value replacement/substitution. The system 10 can determine which x values to perform such replacement/substitution on. This may be effective, for example, in only producing modified datasets that improve the overall error variance of the best fit line based on subsequent OLS analysis. One of skill in the art will readily appreciate a wide variety of alternative methods for conducting such an OLS method involving data modification and value substitution (e.g., random cycling through vales, etc.) upon reading the present specification.

Once the novel OLS method or other regression analysis is performed in step 138, the analysis engine 22 causes one or more processors to select the one of the produced datasets (e.g., including the original dataset generated in step 136 and the plurality of modified datasets generated in step 138) having the least associated value of error variance (step 140). Step 140 of selecting the dataset having the least associated error variance can include assigning the x values of the selected dataset to each of the non-quantitative response choice. For example, returning to FIG. 12, each of the x values 47 of the selected dataset generated by the OLS method in step 138 can be stored as an interval scale value (e.g., as depicted by the database entries 33) in one or more of the databases 20, 26. Furthermore, each of the stored x values 47 can be associated in the database 20, 26 with the corresponding non-quantitative response choice that it represents.

Accordingly, illustrative embodiments of the present invention can determine that one or more unverified non-quantitative items meet one or more psychometric (e.g., statistical) criteria for acceptability, either individually or as a "scale" (e.g., a cohesive statistical group of non-quantitative items) as would be appreciated by one of skill in the art. In determining the acceptability of the one or more unverified non-quantitative items, the one or more unverified non-quantitative items are thereby verified (e.g., empirically, through the data collected in step 106). Furthermore, illustrative embodiments effectively convert ordinal rank of one or more non-quantitative items determined to be acceptable into interval scale values, thereby allowing further generating, visualization, storage, etc. of psychometric interval scales.

Although the illustrative embodiments depicted in FIGS. 2 through 12 and described herein refer to systems and methods of verifying unverified non-quantitative items based on received responses from users about the unverified non-quantitative items and about verified quantitative items, one of skill in the art will appreciate that other types of unverified items can be determined acceptable and thereby verified, and other types of verified items can be included as a reference based on which the acceptability of the unverified item(s) is determined. For example, one, some, or all of the one or more unverified items included in a survey for which acceptability and verification is desired can be non-quantitative items, e.g., items having non-quantitative response choices (non-quantitative or quantitative) that do not represent a numerical quantity, an expression of quantity, or another quantitative value. Furthermore, once a formerly unverified non-quantitative item is determined to be acceptable and verified, this non-quantitative item can serve as a verified item for inclusion in a survey with a further unverified item. In general, the verified items can be non-quantitative or quantitative, while the unverified items can be non-quantitative or quantitative. Nonetheless, in illustrative embodiments, the unverified items are non-quantitative. However, one of skill in the art will appreciate that many other embodiments and alternatives are possible. All such alternatives are contemplated within the scope of the present invention.

Accordingly, using the methods and systems provided herein, unverified (e.g., newly created) items, such as unverified non-quantitative items, can be determined to be acceptable using empirical evidence (e.g., data collected in the form of survey responses from users), and thereby can be verified. This can prove extremely useful for a wide variety of applications, including to gather consumer data, provide mechanisms for creating more targeted advertisements, etc. Furthermore, in verifying and determining the acceptability of non-quantitative items, psychometrically acceptable surveys can be presented to users that are more user-friendly and do not require large amounts of reading. By presenting pictures rather than text, a larger number of users can be targeted and the number of willing respondents to a survey can be increased. This can have the effect of improving the quality and representative accuracy of survey results.

Figure 10:
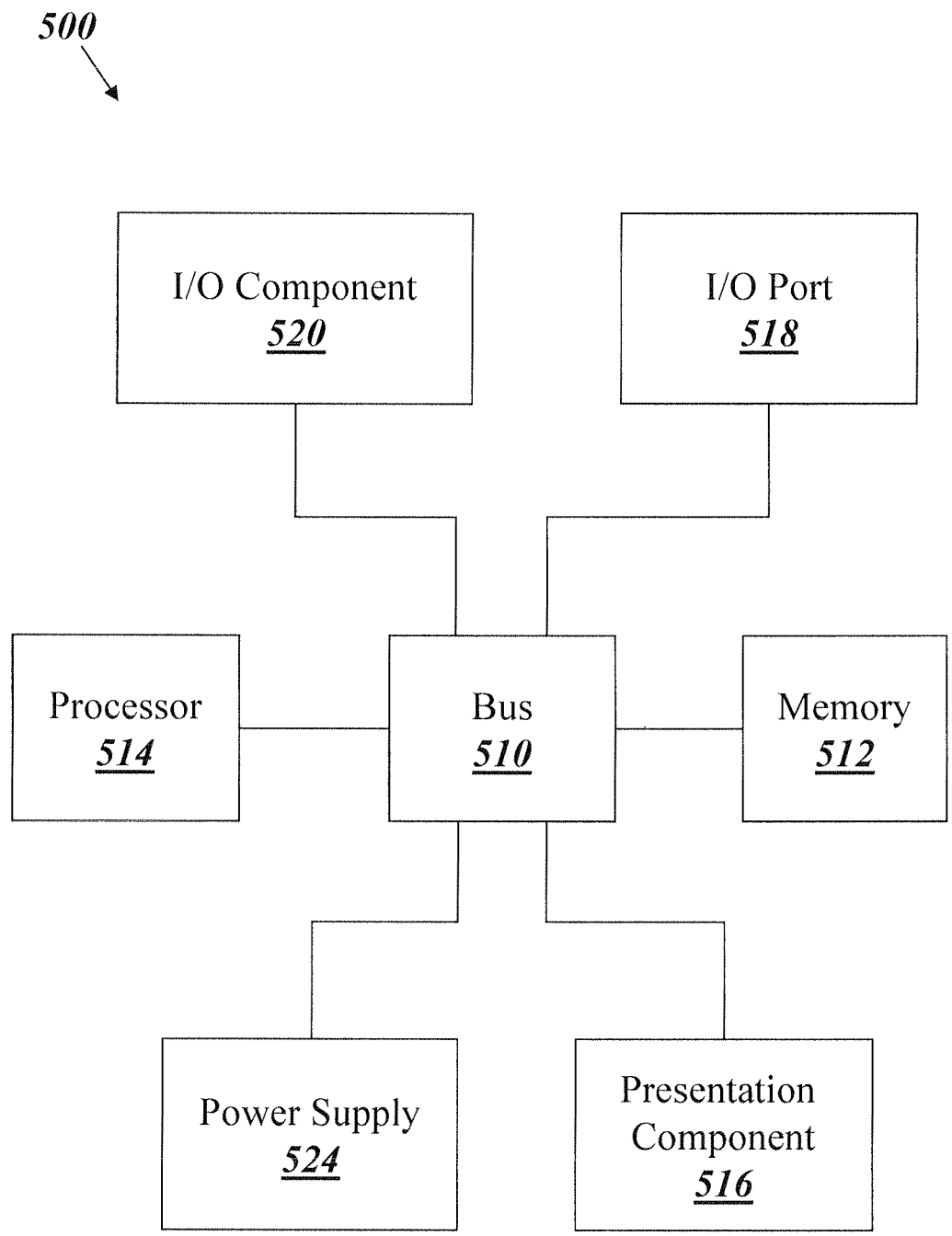
FIG. 10 is a diagrammatic illustration of an example computing device for implementing embodiments of the present invention.

Any suitable computing device can be used to implement the system 10 and methods/functionality described herein. One illustrative example of such a computing device 500 is depicted in FIG. 10. The computing device 500 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 516, etc. Presentation component(s) 516 present data indications to a user or other device. Exemplary presentation components include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method for determining acceptability of an unverified survey item, thereby verifying the survey item for inclusion in a survey presented on an interactive display, the method comprising:
  outputting, through at least one output device, one or more interactive electronic displays comprising a survey with selectable response choices, the survey comprising:
    a verified quantitative item for measuring respondent positions along a continuum for a first trait, the verified quantitative item comprising a prompt and a plurality of quantitative response choices; and
    at least one unverified non-quantitative item comprising a psychometric ordinal rank for measuring respondent positions along the continuum for the first trait, the at least one unverified non-quantitative item further comprising a prompt and a plurality of non-quantitative response choices for which there is no inherent a priori natural order relative to the first trait;

receiving from a plurality of users, through at least one input device, a plurality of responses to the verified quantitative item;

receiving from a plurality of users, through at least one input device, a plurality of responses to the at least one unverified non-quantitative item;

measuring, using at least one processor, respondent positions along the continuum for the first trait in the plurality of responses to the verified quantitative item based on quantitative differences in quantitative values;

assessing, using at least one processor, psychometric acceptability of the at least one unverified non-quantitative item based at least in part on the plurality of responses to the at least one unverified non-quantitative item relative to the plurality of responses to the verified quantitative item, wherein the at least one unverified non-quantitative item determined to be at least one acceptable non-quantitative item is thereby verified empirically through data collected from the survey;

converting the psychometric ordinal rank of at least one acceptable non-quantitative item into interval scale values by determining, using at least one processor, an interval scale value for each of the plurality of non-quantitative response choices included in the at least one acceptable non-quantitative item and associated with the corresponding non-quantitative response choices in a database;

generating a statistically cohesive collection of verified items for measuring the degree to which respondents possess a particular trait based on the at least one acceptable non-quantitative item utilizing the interval scale values rather than the psychometric ordinal rank;

generating psychometric interval scales for the at least one acceptable non-quantitative item;

storing, using at least one processor and databases, psychometric interval scales and interval scale values;

generating visualizations of psychometric interval scales wherein displayed non-quantitative response choices correspond to interval scale values that indicate not only an ordinal rank but also a degree of relative difference in comparison to interval scale values of other response choices based on quantitative differences in the interval scale values, wherein differences in value between the interval scale values of the non-quantitative response choices indicate degrees of difference between the non-quantitative response choices and intervals of space on a display are based on the interval scale values; and presenting, through at least one output device, psychometrically acceptable surveys to users wherein displayed non-quantitative response choices correspond to interval scale values that indicate not only an ordinal rank but also a degree of relative difference in comparison to interval scale values and/or outputting, through at least one output device, one or more interactive electronic displays further displaying the non-quantitative response choices of the at least one acceptable non-quantitative item presented on a psychometric interval scale for further data collection serving as a verified item included in a survey with a further unverified item.

2. The computer implemented method of claim 1, further wherein the step of assessing psychometric acceptability of the unverified non-quantitative item comprises performing a comparative statistical analysis.

3. The computer implemented method of claim 1, further wherein the step of assessing psychometric acceptability of the unverified non-quantitative item comprises determining one or more psychometric characteristics of the unverified non-quantitative item and determining whether the one or more psychometric characteristics meet one or more predetermined psychometric criteria.

4. The computer implemented method of claim 1, wherein the step of assessing psychometric acceptability of the unverified non-quantitative item comprises determining validity and reliability values of the unverified non-quantitative item.

5. The computer implemented method of claim 1, further comprising determining that the unverified non-quantitative item meets one or more psychometric criteria for acceptability, whereby the unverified non-quantitative item is verified using factor analysis.

6. The computer implemented method of claim 1, wherein the step of determining, using at least one processor, an interval scale value for each of the plurality of non-quantitative response choices included in the at least one acceptable non-quantitative item comprises using an analysis engine to perform data modification and value substitution and determining a verified items value for a given user based on the responses received from the user.

7. The computer implemented method of claim 6, wherein the step of determining an interval scale value for each of the plurality of non-quantitative response choices comprises performing a linear regression analysis.

8. The computer implemented method of claim 6, wherein the step of determining an interval scale value for each of the plurality of non-quantitative response choices comprises:
generating, using at least one processor, a dataset comprising plurality of data points each representing selections received from one of the plurality of users; and
determining, using at least one processor, an equation defining a best fit curve for the dataset.

9. The computer implemented method of claim 6, wherein the step of determining an interval scale value for each of the plurality of non-quantitative response choices comprises generating, using at least one processor, a dataset comprising plurality of data points each comprising a first value and a second value for a user of the plurality of users, the first value being based on the ordinal rank of a response to the unverified non-quantitative item from the user, and the second value being based on the response to the verified quantitative item from the user.

10. The computer implemented method of claim 6, wherein the step of determining an interval scale value for each of the plurality of non-quantitative response choices further comprises:
generating, using at least one processor, a dataset comprising plurality of data points each representing selections received from one of the plurality of users;
generating one or more modified datasets based on the generated dataset, each of the one or more modified datasets having one or more substituted values;
determining a best fit line for each of the one or more modified datasets; and
selecting one of the one or more modified datasets having the best fit line associated with a lowest error variance.

11. The computer implemented method of claim 1, wherein the survey further comprises a plurality of additional verified quantitative items for measuring respondent positions along the continuum for the first trait, wherein the verified quantitative item and the plurality of additional verified quantitative items form a statistically cohesive index of items.

12. The computer implemented method of claim 1, wherein the survey further comprises a plurality of additional unverified non-quantitative items for measuring respondent positions along the continuum for the first trait, each of the plurality of additional unverified non-quantitative items comprising the prompt and a plurality of non-quantitative response choices, wherein the step of assessing psychometric acceptability of the unverified non-quantitative item further comprises assessing psychometric acceptability of the unverified non-quantitative item and the plurality of additional unverified non-quantitative items as a statistically cohesive index of items.

13. A computer implemented system for verifying an unverified survey item for inclusion in a survey presented on an interactive display, the computer implemented system comprising:
   at least one input device;
   at least one output device;
   at least one non-transitory computer readable storage device having instructions stored thereon; and
   at least one processor for executing the instructions, the instructions causing the at least one processor to:
      output, through the at least one output device, one or more interactive electronic displays comprising a survey with selectable response choices, the survey comprising:
         a verified quantitative item for measuring respondent positions along a continuum for a first trait, the verified quantitative item comprising a prompt and a plurality of quantitative response choices; and
         at least one unverified non-quantitative item comprising a psychometric ordinal rank for measuring respondent positions along the continuum for the first trait, the unverified at least one non-quantitative item further comprising a prompt and a plurality of non-quantitative response choices for which there is no inherent a priori natural order relative to the first trait;
      receive, from a plurality of users, through at least one input device, a plurality of responses to the verified quantitative item;
      receive, from a plurality of users, through at least one input device, a plurality of responses to the at least one unverified non-quantitative item;
      measure, using at least one processor, respondent positions in the plurality of responses to the verified quantitative item based on quantitative differences in quantitative values;
      assess, using at least one processor, psychometric acceptability of the at least one unverified non-quantitative item based at least in part on a plurality of responses to the at least one unverified non-quantitative item relative to a plurality of responses to the verified quantitative item, wherein the at least one unverified non-quantitative item determined to be at least one acceptable non-quantitative item is thereby verified empirically, through data collected from the survey;
      convert, using at least one processor, the psychometric ordinal rank of at least one acceptable non-quantitative item into interval scale values by determining, using at least one processor, an interval scale value for each of the plurality of non-quantitative response choices included in the at least one acceptable non-quantitative item and associated with the corresponding non-quantitative response choices in a database;
      generate, using at least one processor, a statistically cohesive collection of verified items for measuring the degree to which respondents possess a particular trait based on the at least one acceptable non-quantitative item utilizing the interval scale values rather than the psychometric ordinal rank;
      generate, using at least one processor, psychometric interval scales for a subset of the at least one acceptable non-quantitative item;
      store, using at least one processor and databases, psychometric interval scales and interval scale values;
      generate, using at least one processor, visualizations of psychometric interval scales wherein displayed non-quantitative response choices correspond to interval scale values that indicate not only an ordinal rank but also a degree of relative difference in comparison to interval scale values of other response choices based on quantitative differences in the interval scale values, wherein differences in value between the interval scale values of the non-quantitative response choices indicate degrees of difference between the non-quantitative response choices and intervals of space on a display are based on the interval scale values; and
      present, through at least one output device, psychometrically acceptable surveys to users wherein displayed non-quantitative response choices correspond to interval scale values that indicate not only an ordinal rank but also a degree of relative difference in comparison to interval scale values and/or output, through at least one output device, one or more interactive displays further displaying the non-quantitative response choices of the at least one acceptable non-quantitative item presented on a psychometric interval scale for further data collection serving as a verified item included in a survey with a further unverified item.

14. The computer implemented system of claim 13, wherein the instructions further cause the at least one processor to determine an interval scale value for each of the plurality of non-quantitative response choices included in the at least one acceptable non-quantitative item comprises using an analysis engine to perform data modification and value substitution and determine a verified items value for a given user based on the responses received from the user.

15. The computer implemented system of claim 14, wherein the interval scale value is determined for each of the plurality of non-quantitative response choices by performing a linear regression analysis.

16. The computer implemented system of claim 14, wherein the interval scale value is determined for each of the plurality of non-quantitative response choices by:
   generating, using the at least one processor, a dataset comprising plurality of data points each representing selections received from one of the plurality of users; and
   determining, using the at least one processor, an equation defining a best fit curve for the dataset.

17. The computer implemented system of claim 14, wherein the interval scale value is determined for each of the plurality of non-quantitative response choices by generating, using at least one processor, a dataset comprising plurality of data points each comprising a first value and a second value for a user of the plurality of users, the first value being based on the psychometric ordinal rank of a response to the unverified non-quantitative item from the user, and the second value being based on the response to the verified quantitative item from the user.

18. The computer implemented system of claim 14, wherein the interval scale value is determined for each of the plurality of non-quantitative response choices by:
generating, using the at least one processor, a dataset comprising plurality of data points each representing selections received from one of the plurality of users;
generating, using the at least one processor, one or more modified datasets based on the generated dataset, each of the one or more modified datasets having one or more substituted values;
determining, using the at least one processor, a best fit line for each of the one or more modified datasets; and
selecting, using the at least one processor, one of the one or more modified datasets having the best fit line associated with a lowest error variance.

19. The computer implemented system of claim 13, wherein the unverified non-quantitative item is pictorial.

20. A non-transitory computer readable storage device having instructions stored thereon, wherein execution of the instructions causes at least one processor to perform a method, the method comprising:
outputting, through at least one output device, one or more interactive electronic displays comprising a survey with selectable response choices, the survey comprising:
a verified quantitative item for measuring respondent positions along a continuum for a first trait, the verified quantitative item comprising a prompt and a plurality of quantitative response choices; and
at least one unverified non-quantitative item comprising a psychometric ordinal rank for measuring respondent positions along the continuum for the first trait, the at least one unverified non-quantitative item further comprising a prompt and a plurality of non-quantitative response choices for which there is no inherent a priori natural order relative to the first trait;
receiving, from a plurality of users, through at least one input device, a plurality of responses to the verified quantitative item;
receiving, from a plurality of users, through at least one input device, a plurality of responses to the at least one unverified non-quantitative item;
measuring, using at least one processor, respondent positions in the plurality of responses to the verified quantitative item based on quantitative differences in quantitative values;
assessing, using at least one processor, psychometric acceptability of the at least one unverified non-quantitative item based at least in part on a plurality of responses to the at least one unverified non-quantitative item relative to a plurality of responses to the verified quantitative item, wherein the at least one unverified non-quantitative item determined to be acceptable non-quantitative items is thereby verified empirically, through data collected from the survey;
converting the psychometric ordinal rank of at least one acceptable non-quantitative item into interval scale values by determining, using at least one processor, an interval scale value for each of the plurality of non-quantitative response choices included in the at least one acceptable non-quantitative item and associated with the corresponding non-quantitative response choices in a database;
generating a statistically cohesive collection of verified items for measuring the degree to which respondents possess a particular trait based on the at least one acceptable non-quantitative item utilizing the interval scale values rather than the psychometric ordinal rank;
generating psychometric interval scales for the at least one acceptable non-quantitative item;
storing, using at least one processor and databases, psychometric interval scales and interval scale values;
generating visualizations of psychometric interval scales wherein displayed non-quantitative response choices correspond to interval scale values that indicate not only an ordinal rank but also a degree of relative difference in comparison to interval scale values of other response choices based on quantitative differences in the interval scale values, wherein differences in value between the interval scale values of the non-quantitative response choices indicate degrees of difference between the non-quantitative response choices and intervals of space on a display are based on the interval scale values; and
presenting, through at least one output device, psychometrically acceptable surveys to users wherein displayed non-quantitative response choices correspond to interval scale values that indicate not only an ordinal rank but also a degree of relative difference in comparison to interval scale values and/or outputting, through at least one output device, one or more interactive displays further displaying the non-quantitative response choices of the at least one acceptable non-quantitative item presented on a psychometric interval scale for further data collection serving as a verified item included in a survey with a further unverified item.

* * * * *